US012623422B2

(12) United States Patent
Clothiaux

(10) Patent No.:    US 12,623,422 B2
(45) Date of Patent:    May 12, 2026

---

(54) USE OF INJECTED SEALANT TO IMPROVE DYNAMIC TIRE BALANCE

(71) Applicant: Bridgestone Americas Tire Operations, LLC, Nashville, TN (US)

(72) Inventor: John D. Clothiaux, Aiken, SC (US)

(73) Assignee: Bridgestone Americas Tire Operations, LLC, Nashville, TN (US)

( * ) Notice: Subject to any disclaimer, the term of this patent is extended or adjusted under 35 U.S.C. 154(b) by 214 days.

(21) Appl. No.: 18/564,129

(22) PCT Filed: Jul. 24, 2022

(86) PCT No.: PCT/US2022/074094
§ 371 (c)(1),
(2) Date: Nov. 27, 2023

(87) PCT Pub. No.: WO2023/044189
PCT Pub. Date: Mar. 23, 2023

(65) Prior Publication Data
US 2024/0246372 A1      Jul. 25, 2024

Related U.S. Application Data

(60) Provisional application No. 63/245,225, filed on Sep. 17, 2021.

(51) Int. Cl.
*B29D 30/06*      (2006.01)
*B60C 19/00*      (2006.01)

(52) U.S. Cl.
CPC ........ *B29D 30/0685* (2013.01); *B60C 19/003* (2013.01); *B29D 2030/0698* (2013.01)

(58) Field of Classification Search
CPC ........ B29D 30/0685; B29D 2030/0686; B29D 2030/0694; B60C 19/00; B60C 19/002;
(Continued)

(56) References Cited

U.S. PATENT DOCUMENTS

| | | | |
|---|---|---|---|
| 4,398,583 A | 8/1983 | Casey | |
| 6,417,918 B1 * | 7/2002 | Anno ................. | G01M 17/022 |
| | | | 73/146 |

(Continued)

FOREIGN PATENT DOCUMENTS

| | | |
|---|---|---|
| CN | 111319286 A | 6/2020 |
| JP | 2001018609 A | 1/2001 |

(Continued)

OTHER PUBLICATIONS

Yukawa Naoki, JP-2016078822-A, machine translation. (Year: 2016).*
(Continued)

*Primary Examiner* — Sedef E Paquette

(57)      ABSTRACT

A method of applying a sealant layer to an inner surface of a tire and a resulting tire are disclosed. Prior to sealant application first and second balance light spots on first and second sides of the tire are identified. A starting location for the sealant bead adjacent the first side of the tire is determined as a function of the location of the first balance light spot. An ending location for the sealant bead adjacent the second side of the tire is determined as a function of the location of the second balance light spot. Balance of the tire is improved by the application of the sealant layer.

10 Claims, 12 Drawing Sheets

(58) Field of Classification Search
CPC ..... B60C 19/003; B60C 19/12; B60C 19/122;
B60C 19/125
USPC ............................ 152/154.1; 156/110.1, 115
See application file for complete search history.

(56) References Cited

U.S. PATENT DOCUMENTS

| | | |
|---|---|---|
| 2008/0264542 A1 | 10/2008 | Hawkins et al. |
| 2014/0283740 A1 | 9/2014 | Son |
| 2015/0107743 A1 | 4/2015 | Seong |
| 2016/0377556 A1 | 12/2016 | Boffa et al. |
| 2017/0297281 A1 | 10/2017 | Yukawa et al. |
| 2020/0001560 A1 | 1/2020 | Matsunami |
| 2020/0189215 A1 | 6/2020 | Griffoin et al. |
| 2021/0245556 A1 | 8/2021 | Griffoin et al. |
| 2022/0016858 A1 | 1/2022 | Pontone |

FOREIGN PATENT DOCUMENTS

| | | | | |
|---|---|---|---|---|
| JP | 2014217953 A | | 11/2014 | |
| JP | 2016078822 A | * | 5/2016 | ............... B60C 5/00 |
| JP | 2019108000 A | | 7/2019 | |
| WO | 2016105410 A1 | | 6/2016 | |
| WO | 2019123201 A1 | | 6/2019 | |
| WO | 2019123272 A1 | | 6/2019 | |
| WO | 2019123275 A1 | | 6/2019 | |
| WO | 2020152593 A1 | | 7/2020 | |

OTHER PUBLICATIONS

Brazil Office Action for corresponding patent application No. BR 112024003850-5, dated Sep. 26, 2024, 4 pages.
Japan Reasons for Rejection for corresponding patent application No. 2024-508632, dated Jan. 7, 2025, 5 pages including an English translation.
European Patent Office for corresponding patent application No. 22870876.4, dated May 23, 2025, 8 pages.
"Defect Classification on Automobile Tire Inner Surfaces using Convolutional Neural Networks", Abstract of IEEE Conference Proceedings (Aug. 17, 2017)( 3 pages).
International Search Report for the corresponding patent application No. PCT/US2022/074094, dated Nov. 18, 2022, 10 pages.

* cited by examiner

USE OF INJECTED SEALANT TO IMPROVE DYNAMIC TIRE BALANCE

BACKGROUND OF THE INVENTION

1. Field of the Invention

The present disclosure relates generally to methods of applying a sealant layer to an inner surface of a tire so as to improve the balance of the tire.

2. Description of the Prior Art

A typical prior art tire sealant cell used for applying a sealant layer is described in WO2019123272A1 and WO2019123275A1.

There is a need for improved methods for applying a sealant layer to an inner surface of a tire such that the sealant layer improves the balance of the tire.

SUMMARY OF THE INVENTION

The present disclosure is directed to methods for improving the inherent balance of the tire when the sealant layer is applied to the tire, and to the improved tire manufactured by such a process.

In one embodiment a method of applying a sealant layer to an inner surface of a tire may include steps of:

(a) identifying a circumferential location of a first balance light spot on a first side of the tire as a first angle $\theta_T$ measured about a rotational axis of the tire from a physical indicia on the tire;

(b) identifying a circumferential location of a second balance light spot on a second side of the tire as a second angle $\theta B$ measured about the rotational axis of the tire from the physical indicia;

(c) determining a target starting location for a sealant bead adjacent the first side of the tire as a target starting angle $\theta_S$ measured about the rotational axis of the tire from the physical indicia, the target starting angle $\theta_S$ being determined as a function of the first angle $\theta_T$;

(d) determining a target ending location for the sealant bead adjacent the second side of the tire as a target ending angle $\theta_E$ measured about the rotational axis of the tire from the physical indicia, the target ending angle $\theta_E$ being determined as a function of the second angle $\theta B$; and (e) applying the sealant bead to the inner surface of the tire in a spiral pattern beginning at an actual starting location selected based upon the target starting angle $\theta_S$ and ending at an actual ending location selected based upon the target ending angle $\theta_E$.

The application of the sealant bead may improve both static and dynamic balance of the tire as compared to the static and dynamic balance of the tire prior to application of the sealant bead.

In any of the above methods the target starting angle $\theta_S$ may be determined by the function $\theta_E = \theta_T + 90°$.

In any of the above methods the target ending angle $\theta_E$ may be determined by the function $\theta_E = \theta_B - 90°$.

In any of the above methods the actual starting angle and the actual ending angle may each be within an acceptable spotting error range of the target starting angle and the target ending angle, respectively.

In any of the above methods the acceptable spotting error range may be plus or minus 45 degrees.

In any of the above methods the acceptable spotting error range may be plus or minus 30 degrees.

In any of the above methods the acceptable spotting error range may be plus or minus 15 degrees.

In any of the above methods the physical indicia may be a bar code located on a first side wall defining the first side of the tire.

In another embodiment a tire manufactured by any of the above methods may include a tread portion and first and second sidewall portions extending radially inward from the tread portion. The tire may have a first balance light spot location on a first side of the tire prior to sealant application measured as a first angle $\theta_T$ about a rotational axis of the tire from a physical indicia on the tire and a second balance light spot location on a second side of the tire prior to sealant application measured as a second angle $\theta B$ about the rotational axis of the tire from the physical indicia on the tire. An inner surface of the tire may define an inner cavity of the tire between the first and second sidewall portions. A spiral wound sealant bead may be laid down on the inner surface, the sealant bead having a starting location closest to the first sidewall and ending location closest to the second sidewall. The starting location may be within a range of 45 degrees to 135 degrees ahead of the first balance light spot location OT relative to a direction of winding of the sealant bead and the ending location may be within a range of 45 degrees to 135 degrees behind the second balance light spot location $\theta_B$ relative to the direction of winding of the sealant bead.

In another embodiment of the above tire the starting location may be within a range of 60 degrees to 120 degrees ahead of the first balance light spot location OT relative to a direction of winding of the sealant bead and the ending location may be within a range of 60 degrees to 120 degrees behind the second balance light spot location $\theta_B$ relative to the direction of winding of the sealant bead.

In another embodiment of the above tire the starting location may be within a range of 75 degrees to 105 degrees ahead of the first balance light spot location OT relative to a direction of winding of the sealant bead and the ending location may be within a range of 75 degrees to 105 degrees behind the second balance light spot location $\theta_B$ relative to the direction of winding of the sealant bead.

Numerous objects, features and advantages of the present invention will be readily apparent to those skilled in the art upon reading of the following disclosure when taken in conjunction with the accompanying drawings.

US 12,623,422 B2

3

Figure 11:
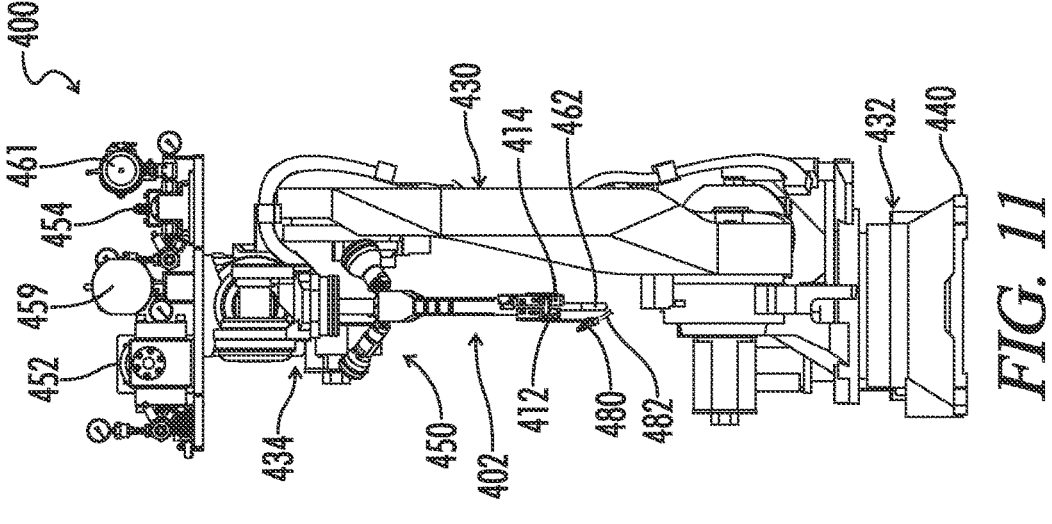
Figure 10:
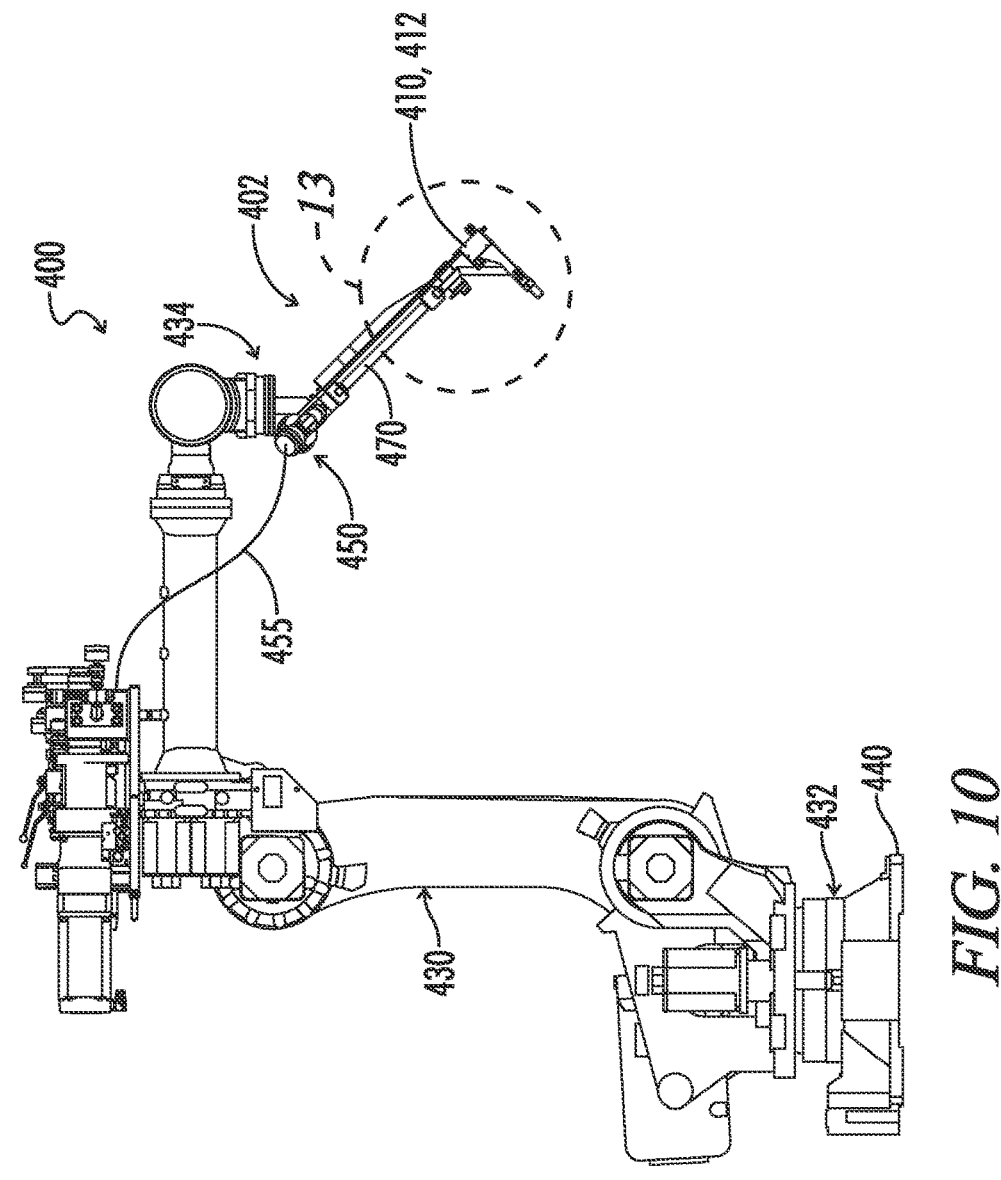
Figures 12, 13, 14:
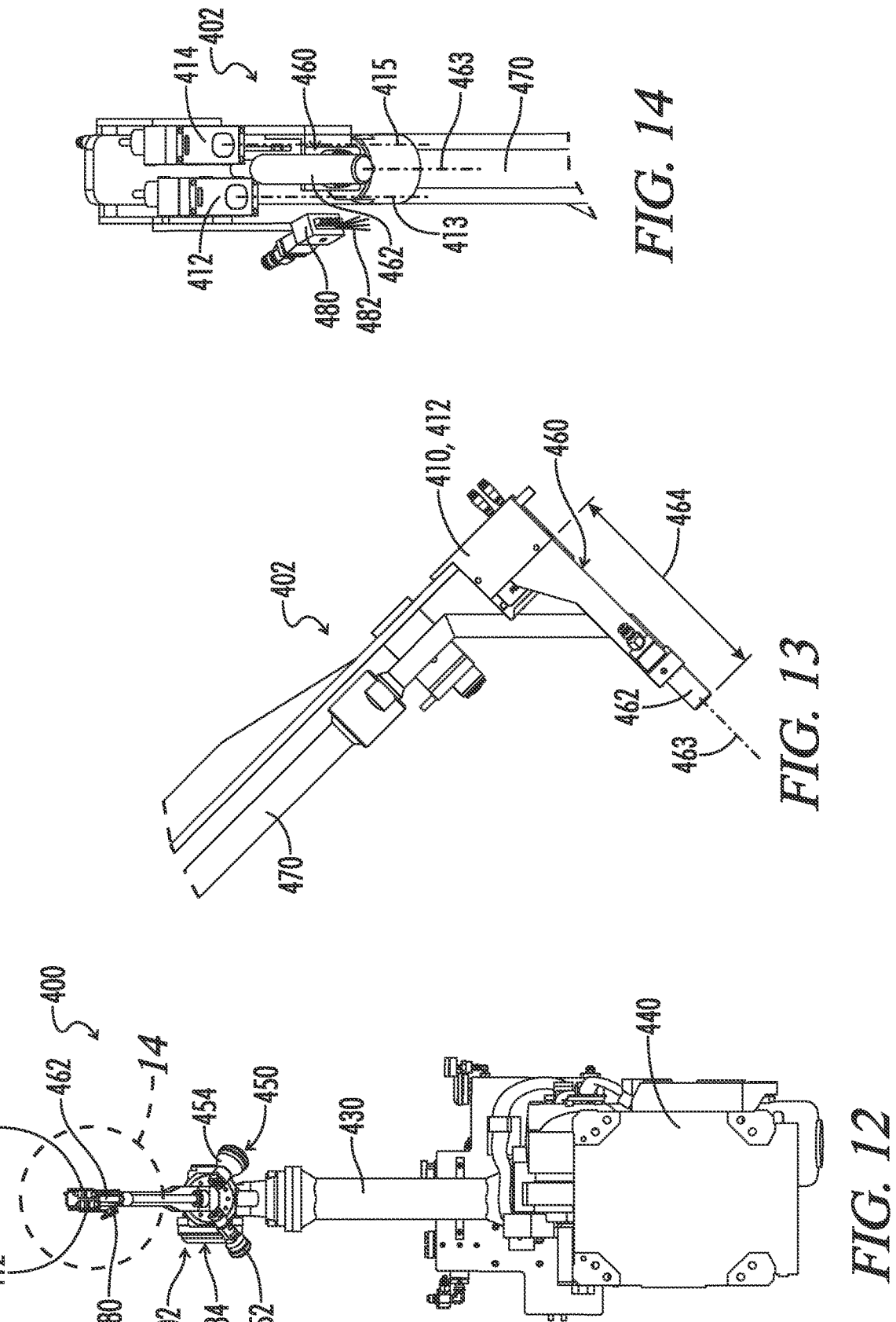
Figure 15:
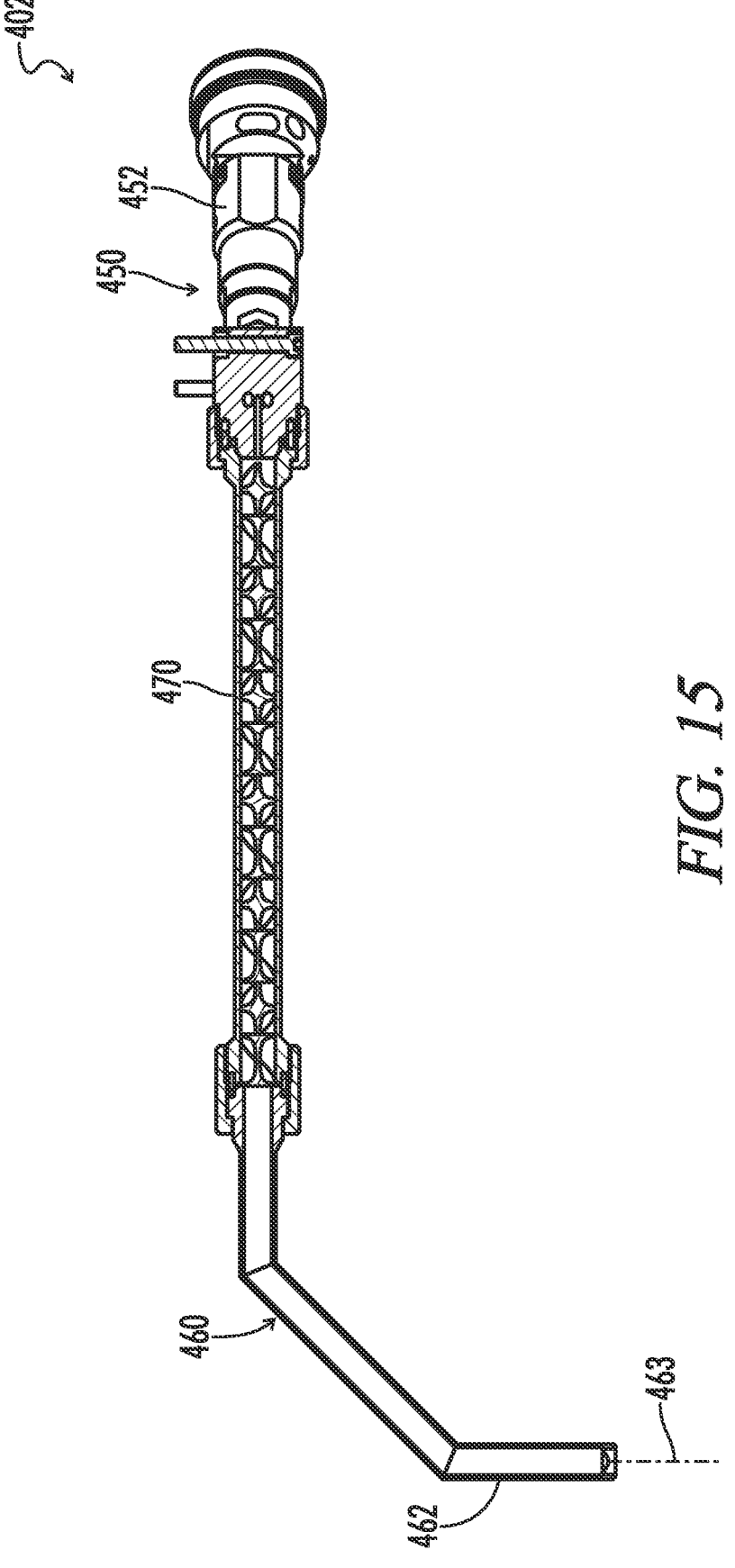
Figure 16:
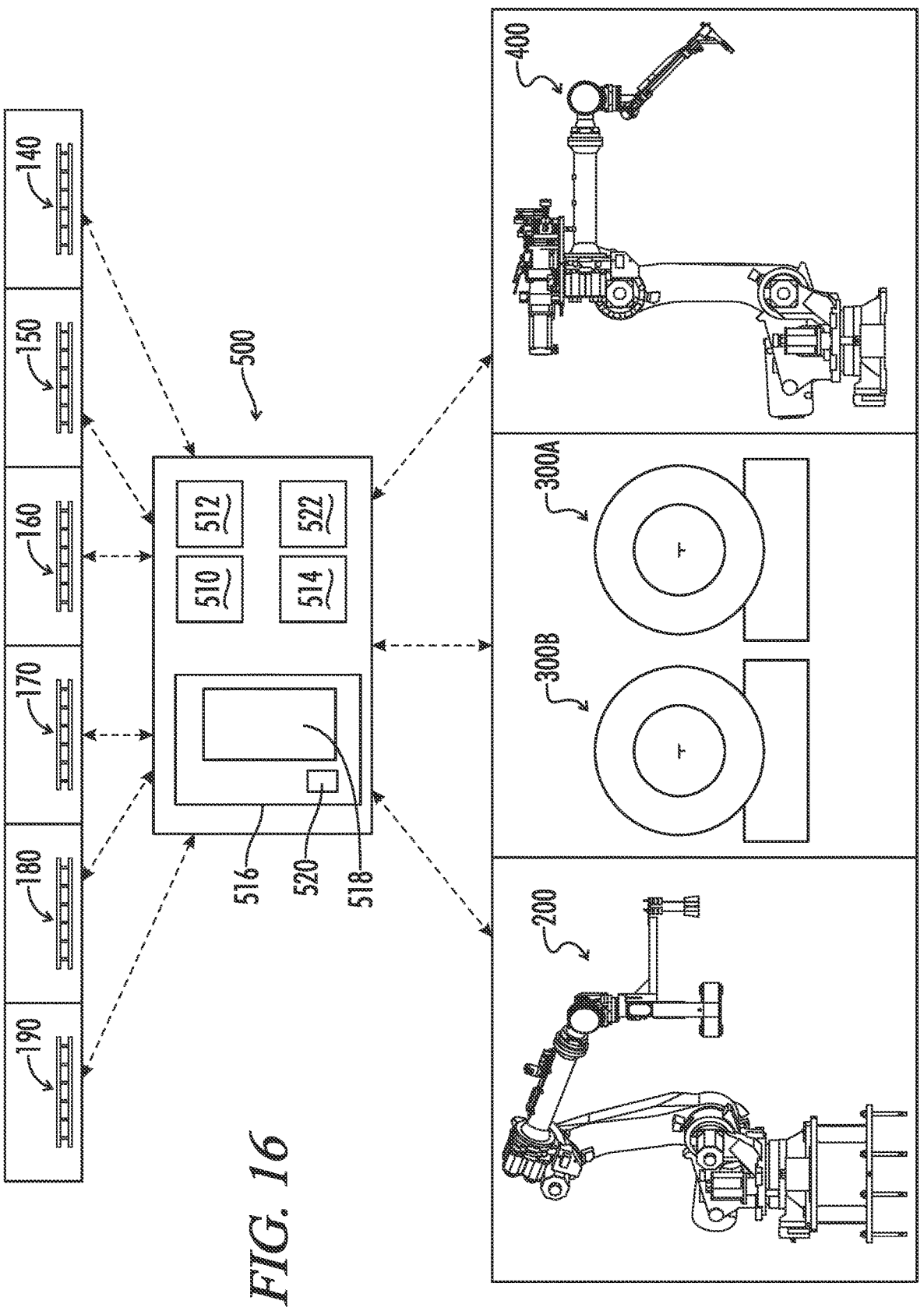
Figure 17:
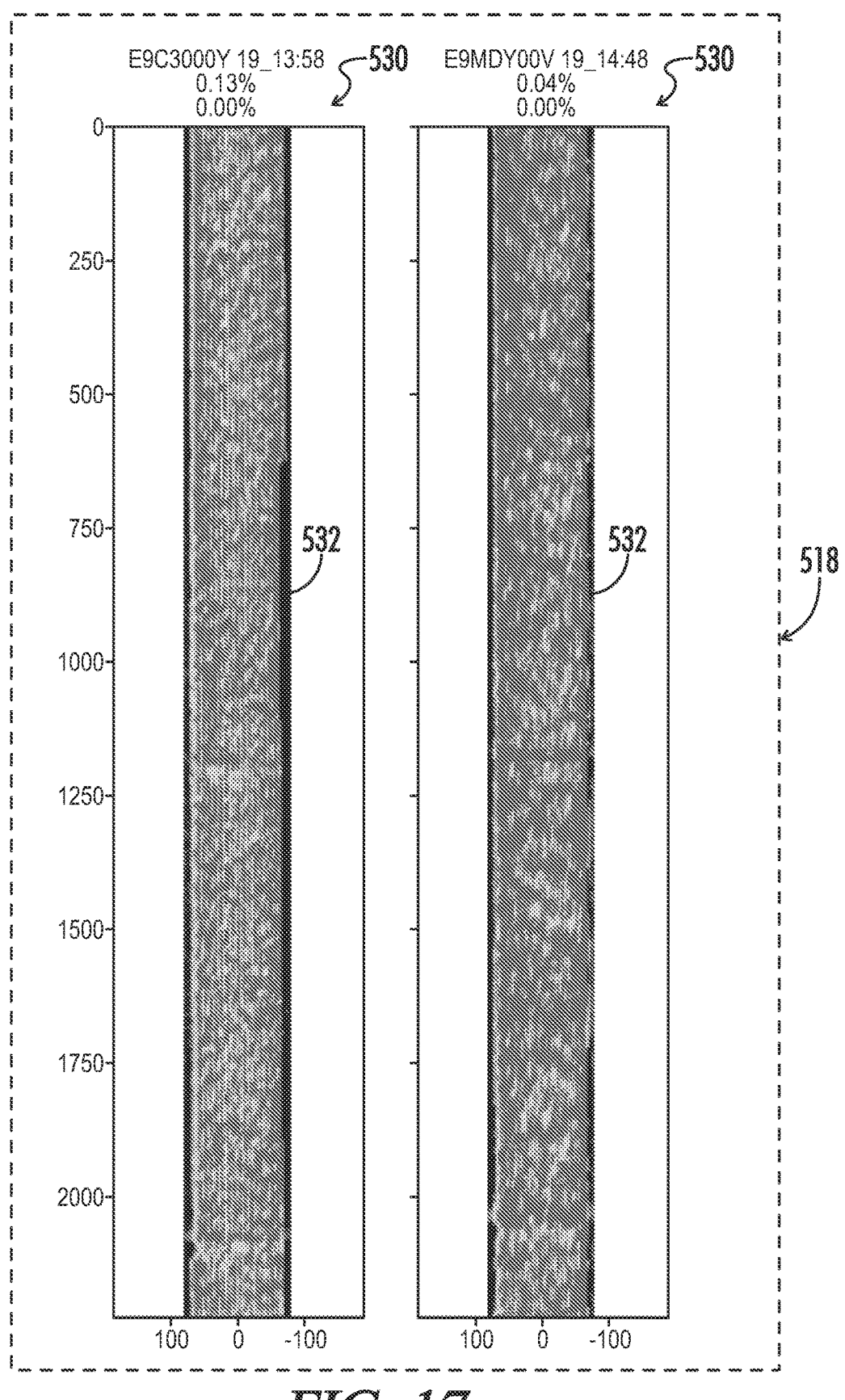
Figure 18:
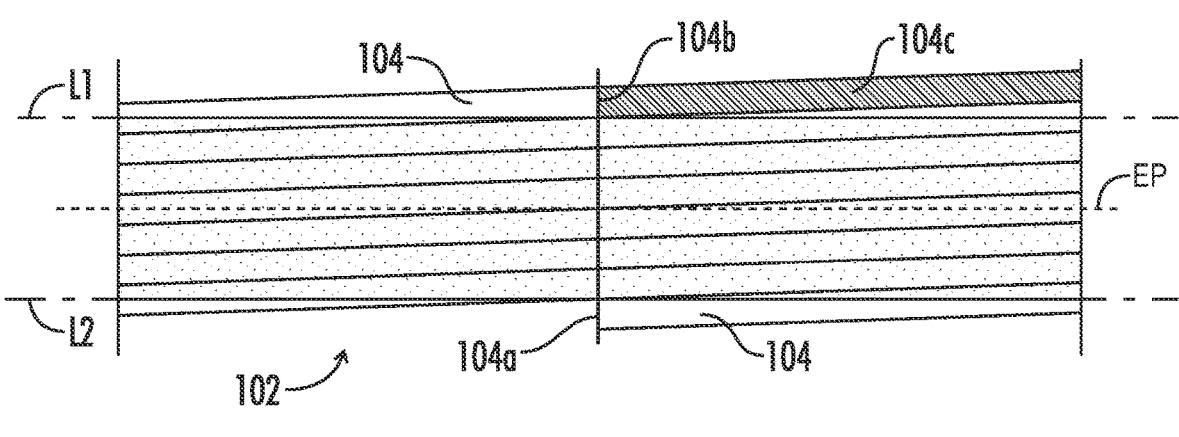
Figure 19:
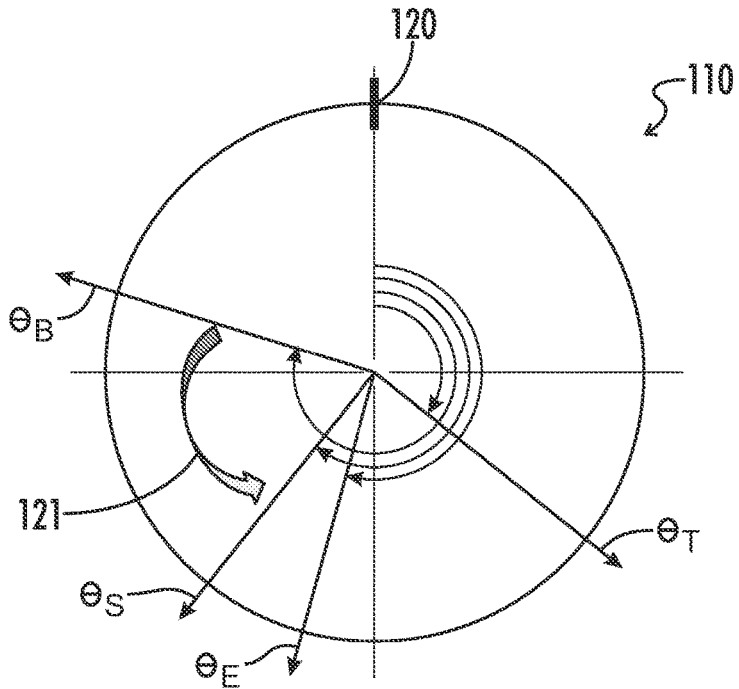

FIG. 10 is a side elevation view of the dispense robot.
FIG. 11 is a front elevation view of the dispense robot.
FIG. 12 is a top plan view of the dispense robot.
FIG. 13 is an enlarged side elevation view of the dispense tool carried by the dispense robot.
FIG. 14 is a front elevation view of the dispense tool carried by the dispense robot.
FIG. 15 is a cross-sectional view of the dispense tool carried by the dispense robot.
FIG. 16 is a schematic diagram of the controller and related components of the tire sealant cell system.
FIG. 17 is a visual representation of a scan of a gauge of the sealant layer on the inner surface of a tire.
FIG. 18 schematically illustrates a hypothetical sealant layer which has been laid down symmetrically about the equatorial plane of the tire. Also shown in cross-hatch is a hypothetical overlap of the ends of the sealant bead.
FIG. 19 is a schematic illustration of a tire oriented as it would be when mounted in one of the application stands. Angular positions of the tire light spots and the target starting and ending angles for application of the sealant bead are shown.

DETAILED DESCRIPTION

Reference will now be made in detail to embodiments of the present disclosure, one or more drawings of which are set forth herein. Each drawing is provided by way of explanation of the present disclosure and is not a limitation. In fact, it will be apparent to those skilled in the art that various modifications and variations can be made to the teachings of the present disclosure without departing from the scope of the disclosure. For instance, features illustrated or described as part of one embodiment can be used with another embodiment to yield a still further embodiment.

Thus, it is intended that the present disclosure covers such modifications and variations as come within the scope of the appended claims and their equivalents. Other objects, features, and aspects of the present disclosure are disclosed in, or are obvious from, the following detailed description. It is to be understood by one of ordinary skill in the art that the present discussion is a description of exemplary embodiments only and is not intended as limiting the broader aspects of the present disclosure.

The words "connected", "attached", "joined", "mounted", "fastened", and the like should be interpreted to mean any manner of joining two objects including, but not limited to, the use of any fasteners such as screws, nuts and bolts, bolts, pin and clevis, and the like allowing for a stationary, translatable, or pivotable relationship; welding of any kind such as traditional MIG welding, TIG welding, friction welding, brazing, soldering, ultrasonic welding, torch welding, inductive welding, and the like; using any resin, glue, epoxy, and the like; being integrally formed as a single part together; any mechanical fit such as a friction fit, interference fit, slidable fit, rotatable fit, pivotable fit, and the like; any combination thereof; and the like.

Unless specifically stated otherwise, any part of the apparatus of the present disclosure may be made of any appropriate or suitable material including, but not limited to, metal, alloy, polymer, polymer mixture, wood, composite, or any combination thereof.

Figure 1:
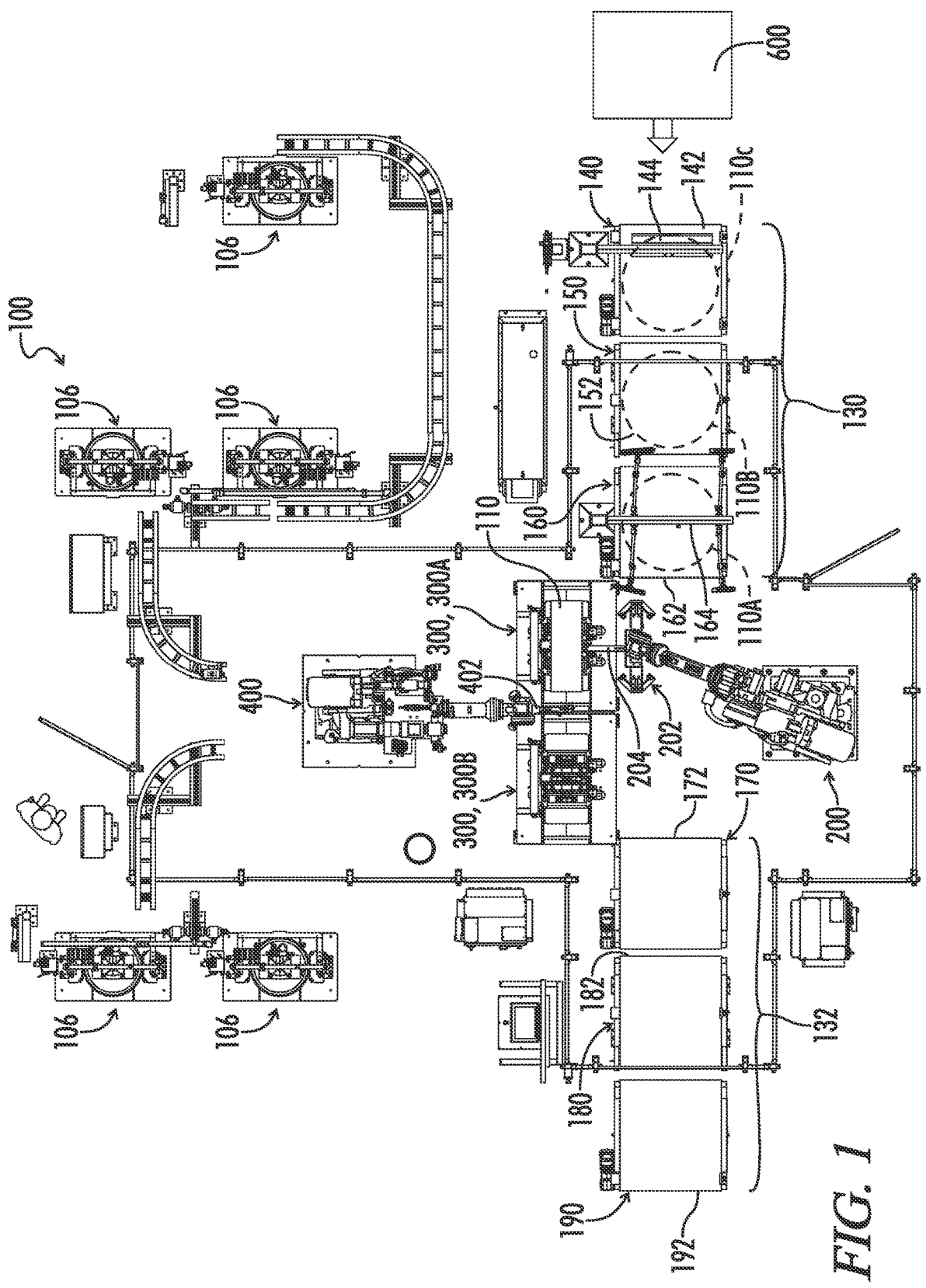
FIG. 1 is a plan view of the tire sealant cell system in accordance with the present disclosure.
Figure 2:
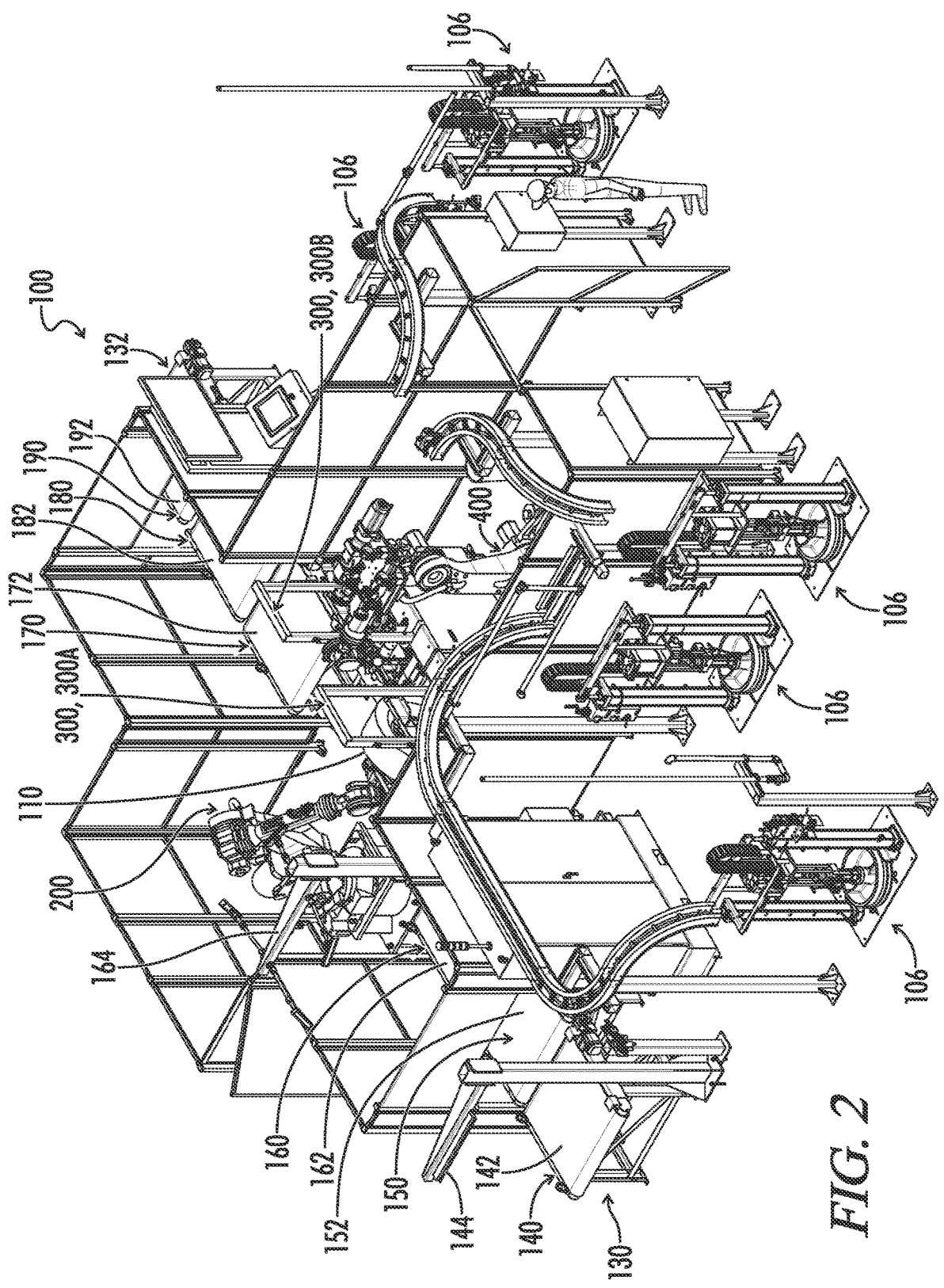
FIG. 2 is a left front perspective view of the tire sealant cell system of FIG. 1.

The Overall Process:

FIG. 1 schematically illustrates a top plan view of a tire sealant cell system 100 and FIG. 2 schematically illustrates a perspective view of the tire sealant cell system 100. The tire sealant cell system 100 may also be referred to herein as a tire sealant cell 100. The tire sealant cell system 100 is configured to automatically apply a sealant layer 102 to an inner surface portion 112 of a tire 110. The sealant layer 102 may be configured to automatically seal a hole (not shown) in the tire 110 which may be caused by road debris, such as, for example a nail or the like (not shown). As such, the sealant layer 102 is neither a solid nor a liquid, but remains in a semi-viscous state such that the sealant layer 102 can bind to the road debris, which has penetrated the tire 110, and to itself upon removal of said road debris such that no air can escape a cavity 114 of the tire 110. The inner surface portion 112 of the tire 110 may also be referred to herein as an inner surface 112 of the tire 110. The cavity 114 of the tire 110 may also be referred to herein as an interior 114 of the tire 110. The inner surface portion 112 of the tire 110 may be defined opposite the tread portion 116 of the tire 110 and may extend at least partially up the sidewalls 118a and 118b of the tire 110. The tread portion 116 of the tire 110 may also be referred to herein as an outside tread surface 116 of the tire 110. The tire sealant cell system 100 may provide higher output with better ratios than existing systems.

The sealant layer 102 may, for example, be comprised of DOW® sealant. In certain embodiments, the sealant layer 102 may be a 10:1 by weight DOW® sealant comprising a Part A component (not shown) and a Part B component (not shown) which may be stored separately and mixed together upon application. In other embodiments, the ratio may be adjusted. The initial cure time of the sealant layer 102 may be one-day, with a full cure in 28-days. The tire 110 can be moved before the one-day mark as long as care is taken not to significantly deform the tire 110. As such, handling the tire 110 via the tread portion 116 may be useful, as further disclosed below.

Tires (e.g., a first tire 110A, a second tire 110B, a third tire 110C, etc.) first interact with the tire sealant cell system 100 by being sequentially received by a supply conveyor 130 of the tire sealant cell system 100. The tires exit the tire sealant cell system 100 via a discharge conveyor 132 of the tire sealant cell system 100.

Figure 3:
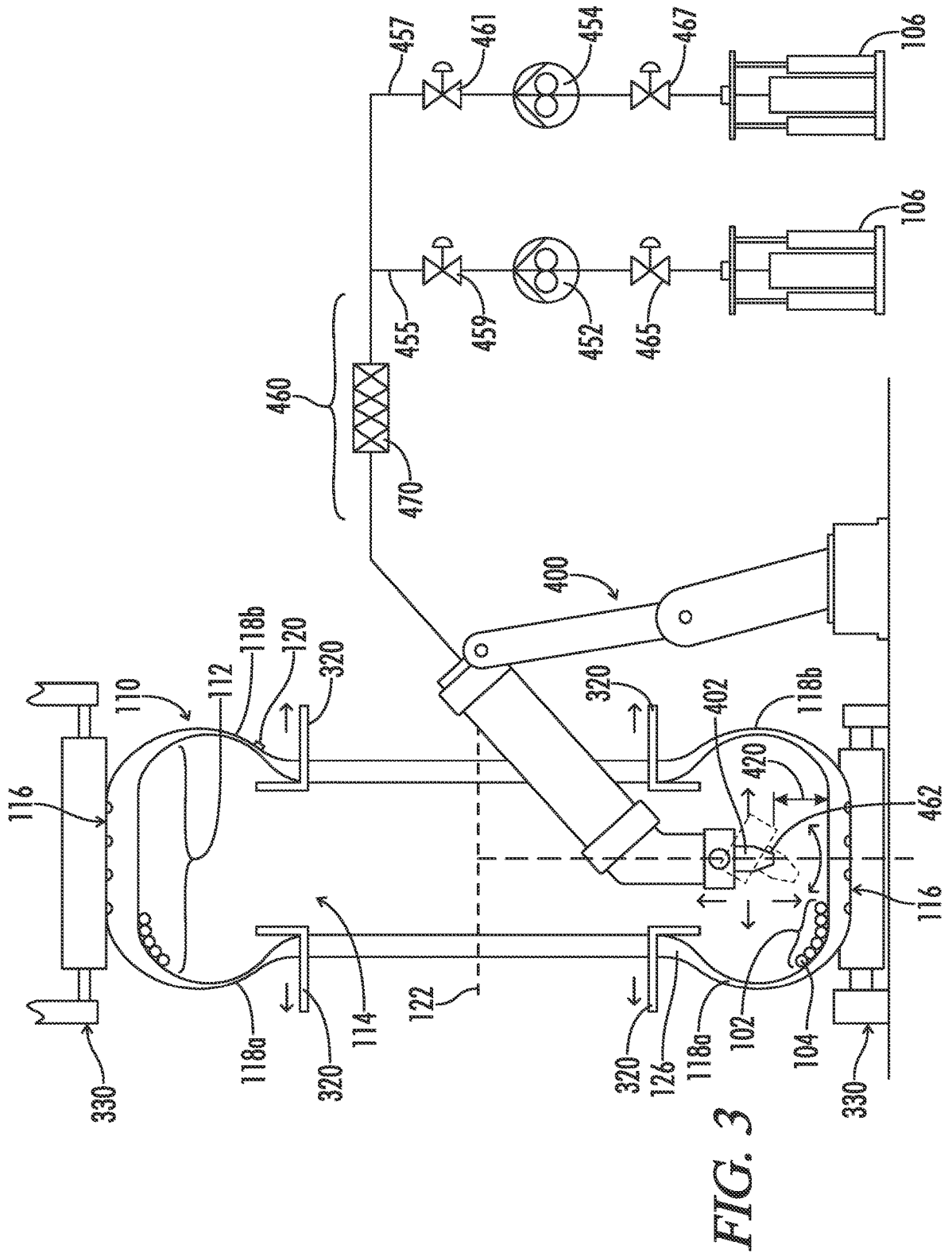
FIG. 3 is a schematic cross-section view of a tire located on one of the application stands with the dispense robot holding the dispense tool within the cavity of the tire to apply a sealant bead.

The supply conveyor 130 may include a tire identification station 140. The tire identification station 140 may include a first conveyor belt 142 for moving the tire 110 along the supply conveyor 130. The tire identification station 140 may further include a bar code reader (BCR) 144 which is configured to scan a tire code 120 (see FIG. 7) of the tire 110. The tire code 120 may also be referred to herein as a bar code 120. The bar code reader 144 may also be referred to herein as a scanner 144. The bar code reader 144 may, for example, be a Datalogic BCR array or the like. The tire code 120 may be specific to the tire 110 and may be inscribed or defined on an outer surface of the tire 110, as shown in FIG. 3. The tire code 120 may further be associated with specific information about the tire 110, such as, the tire's width, tread depth, sidewall height, opening diameter, or the like.

The supply conveyor 130 may further include first weigh station 150. The first weigh station 150 may include a second conveyor belt 152 for moving the tire 110 along the supply conveyor 130. The first weigh station 150 is configured to weigh and record a weight of the tire 110 prior to application of the sealant layer 102 within the tire 110.

The supply conveyor 130 may further include a tire position station 160. The tire position station 160 may include third conveyor belt 162 for moving the tire 110 along the supply conveyor 130. The tire position station 160 may further include a scanner 164 configured to locate a center 122 of the tire 110. The center 122 of the tire 110 may also be referred to herein as a rotational axis 122 of the tire 110, as shown in FIG. 3. In certain optional embodiments, the scanner 164 may be a Fanuc irVision camera, or the like, which may be paired with polarized blue lighting (not shown) to help identify the center 122 of the tire 110. In accordance with this embodiment, the third conveyor belt 162 may be colored blue in order to increase the effectiveness of the scanner 164 (e.g., the Fanuc irVision camera or the like).

The tire sealant cell system 100 may further comprise a tire handling robot 200, at least one application stand 300, and a dispense robot 400. The at least one application stand 300 may also be referred to herein as at least one sealant application stand 300. As illustrated, the at least one application stand 300 includes a first application stand 300A and a second application stand 300B. The first and second application stands 300A, 300B may be identical and will be further described with respect to the at least one application stand 300.

The first and second application stands 300A, 300B may be arranged adjacent to each other such that tires (e.g., a first tire 110A, a second tire 110B, a third tire 110C, etc.) may be received on the first and second application stands 300A, 300B with rotational axes 122 of the tires oriented generally horizontally. The tires received on the first and second application stands 300A, 300B may be aligned end-to-end with the tread portions 116 facing each other. The tire handling robot 200 may be positioned on one side of the first and second application stands 300A, 300B. The dispense robot 400 may be positioned on an opposite side of the first and second application stands 300A, 300B. Accordingly, one sidewall of the tire 110 faces the tire handling robot 200 and another sidewall of the tire 110 faces the dispense robot 400 when the tire 110 is received by one of the first or second application stands 300A, 300B.

The tire handling robot 200 may be configured to pick up the tire 110 off of the supply conveyor 130, or more specifically, the third conveyor belt 162 of the tire position station 160, using a tire gripping tool 202 of the tire handling robot 200 and place the tire 110 on one of the first or second application stands 300A, 300B, whichever is not occupied. The tire gripping tool 202 is configured to engage the tread portion 116 of the tire 110 when moving the tire 110. A gripping force of the tire gripping tool 202 may be adjusted based upon the tire code 120.

In certain embodiments, the tire handling robot 200 may further include a scanner 204. Once the tire handling robot 200 places the tire 110 on one of the at least one application stands 300, the tire gripping tool 202 disengages the tire 110 and a scanner 204, carried by the tire handling robot 200, may be used to scan (e.g., an initial scan or pre-scan) the inner surface portion 112 of the tire 110 while the tire 110 is rotated by the at least one application stand 300. In other embodiments, the dispense robot 400 may include a scanner for performing the initial scan.

Figure 4:
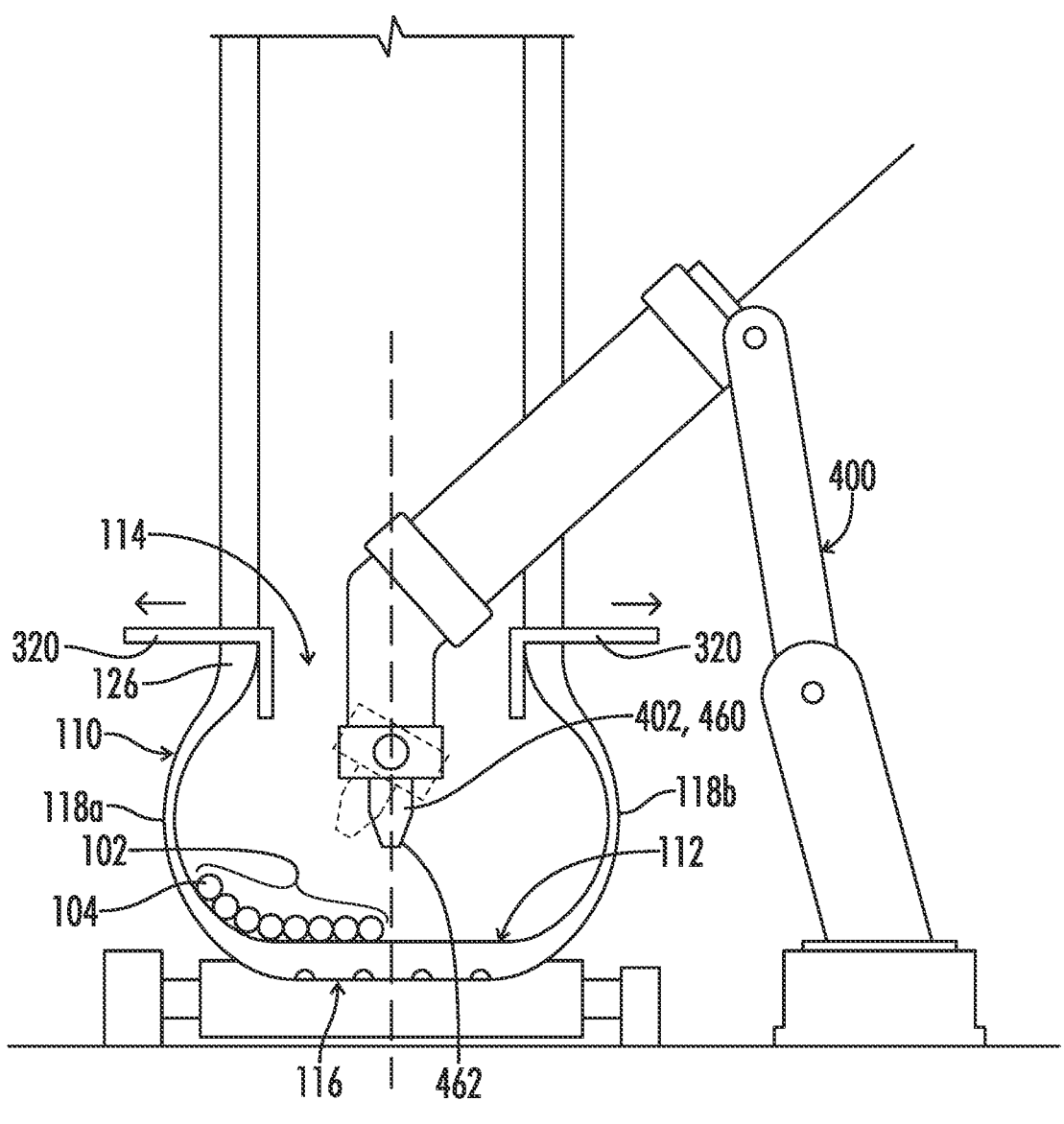
FIG. 4 is an enlarged schematic cross-section of the tire showing the sealant bead partially laid down to form the sealant layer on the inner surface of the tire.

The dispense robot 400 may be configured to apply a sealant bead 104 (as shown in FIGS. 3 and 4) using a dispense tool 402 of the dispense robot 400, to the inner surface portion 112 of the tire 110 while the tire 110 is rotated by one of the at least one application stands 300. The sealant bead 104 may be dispensed by the dispense tool 402 in a continuous ribbon on the inner surface portion 112 of the tire 110 as the tire 110 is rotated by one of the at least one application stands 300 to form the sealant layer 102. The sealant bead 104 is preferably generally rectangular in shape. The width of sealant bead 104 may be in a range of from 6 mm to 18 mm, preferably from 6 mm to 10 mm. The thickness of the sealant bead may be in a range from 3 mm to 5 mm, preferably about 4 mm. In an embodiment the sealant bead may have a width of 8 mm and a thickness of 4 mm. In other embodiments, the width and thickness of the sealant bead 104 may differ.

The dispense robot 400 may utilize the initial scan of the inner surface portion 112 of the tire 110, as described above and performed by either the tire handling robot 200 or the dispense robot 400, to calculate a path of travel, for example, in x, y, z coordinates for dispensing the sealant bead 104.

The dispense robot 400 may include at least one sensor 410 positioned on the dispense tool 402 of the dispense robot 400. The at least one sensor 410 may be configured to detect a position of the dispense tool 402 relative to the inner surface portion 112 of the tire 110. The at least one sensor 410 may further be configured to detect a distance 420 between the dispense tool and the inner surface portion 112 of the tire 110. In certain embodiments, at least one sensor 410 may be utilized to perform the initial scan of the inner surface portion 112 of the tire 110 while the tire 110 is rotated by the at least one application stand 300.

Once the dispense robot 400 has completed depositing the sealant bead 104 on the inner surface portion 112 of the tire 110 to form the sealant layer 102, one of the tire handling robot 200 or the dispense robot 400 may be configured to scan (e.g., a final scan or post-scan) the sealant layer 102 to determine if a gauge (e.g., a thickness) of the sealant layer 102 or sealant bead 104 is within set criteria (e.g., a minimum allowable gauge of the sealant layer 102). For example, the gauge must be sufficient such that the sealing performance is not adversely affected. Accordingly, in certain embodiments, the scanner 204 of the tire handling robot 200 may be utilized to scan the sealant layer 102 on the inner surface portion 112 of the tire 110. In other embodiments, at least one sensor 410 may be utilized to scan the sealant layer 102 on the inner surface portion 112 of the tire 110.

The tire sealant cell system 100 may perform the final scan and may record data corresponding to the gauge of the sealant layer 102 on the inner surface portion 112 of the tire 110 in correlation with data corresponding to a location of the sealant layer 102 on the inner surface portion 112 of the tire 110. As shown in FIG. 17, the tire sealant cell system 100 may further include a display 518 which is configured to display a visual image 530 representative of the sealant layer 102 on the inner surface portion 112 of the tire 110. The visual image 530 may include visual indicia 532, generally color coded, corresponding to whether the gauge of the sealant layer is within the set criteria. The visual image 530 may show a flat version of the tire 110 broken out into, for example, 5 mm by 5 mm sections. Each section may include the visual indicia 532.

In certain optional embodiments, at least one sensor 410 may be utilized to scan, in real-time, the gauge of the sealant bead 104 as it is applied to the inner surface portion 112 of the tire 110 and transmit associated data to be displayed on the display 518.

Once the final scan is complete, the tire handling robot 200 may pick up the completed tire 110 off of the first or second application stands 300A, 300B and place the tire 110 on the discharge conveyor 132. More specifically, the tire handling robot 200 may place the tire 110 on a discharge receiving station 170 of the discharge conveyor 132. The discharge receiving station 170 may include a fourth conveyor belt 172 for moving the tire 110 along the discharge conveyor 132.

The discharge conveyor 132 may further include second weigh station 180. The second weigh station 180 may include a fifth conveyor belt 182 for moving the tire 110 along the discharge conveyor 132. The second weigh station 180 is configured to weigh the tire 110 after application of the sealant layer 102 within the tire 110. A change in weight of the tire 110 may be determined based on data from the first weigh station 150 and the second weight station 180. The change in weight may be recorded, stored, and aggregated, and may be used as a baseline data set associated with particular tires via the tire code 120.

The discharge conveyor 132 may further include a final station 190. The final station 190 may include a sixth conveyor belt 192 for moving the tire 110 along the discharge conveyor 132. The tire 110 may exit the tire sealant cell system 100 from the final station 190. In other embodiments, the tire 110 may exit the tire sealant cell system 100 from the second weigh station 180.

The tire sealant cell system 100 further includes a plurality of electronic flow (eFlow) drum pumps 106, each containing one of the two components used to create the sealant used for the sealant bead 104. Sealant for the sealant bead 104 is provided to the dispense robot 400 from at least two of the plurality of eFlow drum pumps 106 at a given time, each of the at least two eFlow drum pumps containing a different one of the two components used to create the sealant used for the sealant bead 104. The two components are mixed by the dispense robot 400 just prior to application of the sealant bead 104 to the inner surface portion 112 of the tire 110.

Tires (e.g., a first tire 110A, a second tire 110B, a third tire 110C, etc.) may continuously enter and exit the tire sealant cell system 100. For example, one tire may be on each of the six conveyor belts and the first and second application stands 300A, 300B at a given time. The dispense robot 400 may move back and forth between the first and second application stands 300A, 300B, applying the sealant bead 104 within a tire positioned on the given application stand before moving to the other. For example, the tire handling robot 200 may position a first tire 110A on the first application stand 300A and then the initial scan may be performed. While the dispense robot 400 applies the sealant bead 104 to the inner surface portion 112 of the first tire 110A, the tire handling robot 200 may proceed to position a second tire 110B on the second application stand 300B. Once the dispense robot 400 has completed applying the sealant bead 104 to the first tire 110A, the dispense robot 400 may move to the second application stand 300B and begin applying the sealant bead 104 to the inner surface portion 112 of the second tire 110B. Once the final scan of the first tire 110A has been performed, the tire handling robot 200 may proceed to remove the first tire 110A from the first application stand 300A and position the first tire 110A on the discharge conveyor 132. The tire handling robot 200 may then proceed to position a third tire 110C on the first application stand 300A. Once the dispense robot 400 has completed applying the sealant bead 104 to the second tire 110B, the dispense robot 400 may move back to the first application stand 300A and begin applying the sealant bead 104 to the inner surface portion 112 of the third tire 110C. Once the final scan of the second tire 110B has been performed, the tire handling robot 200 may proceed to remove the second tire 110B from the second application stand 300B and position the second tire 110B on the discharge conveyor 132. Application of the sealant layer 102 to tires may generally and successively proceed in this general manner. By including first and second application stands 300A, 300B, the efficiency or throughput of the tire sealant cell system 100 is increased.

Figures 5, 6:
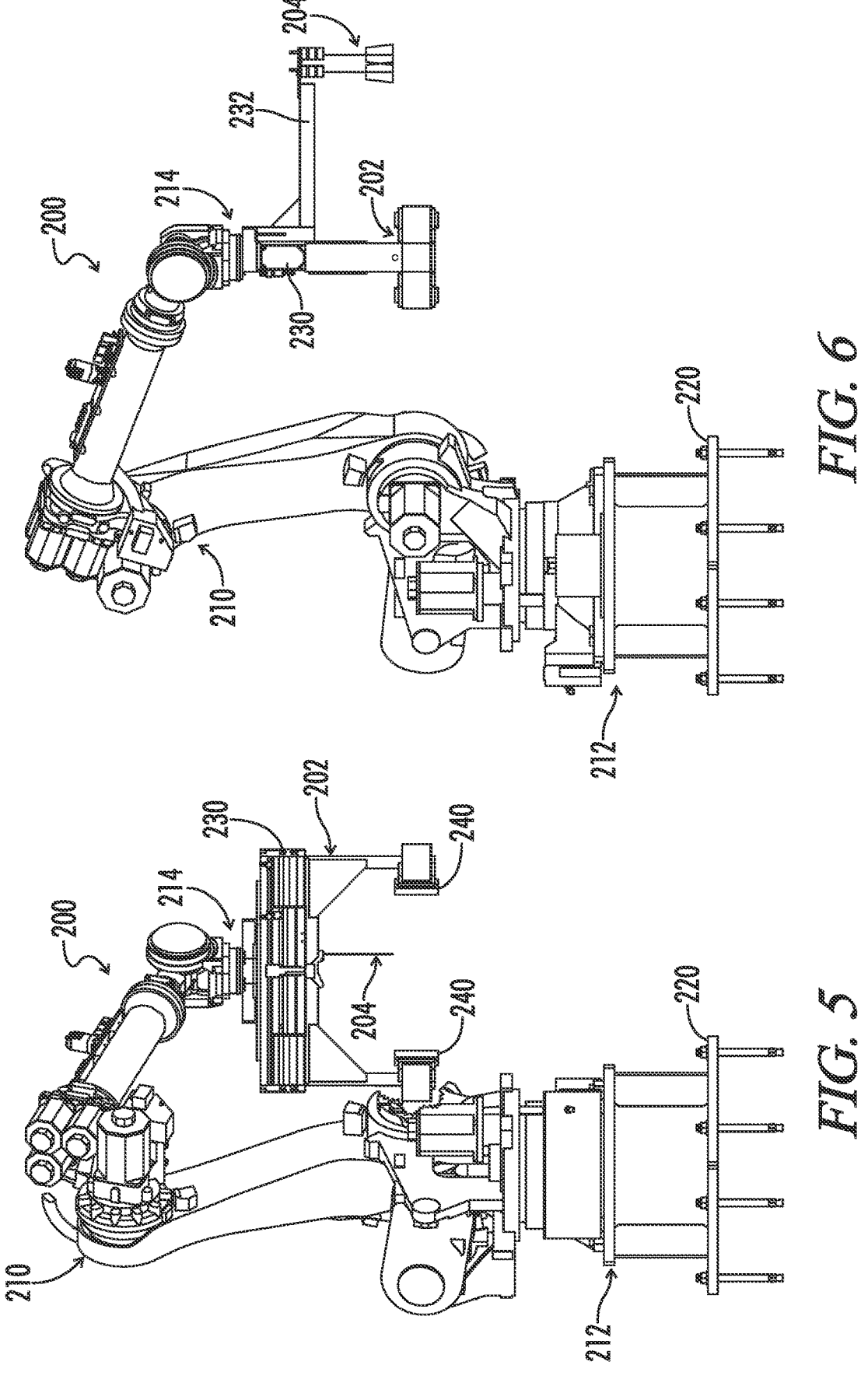
FIG. 5 is a front elevation view of the tire handling robot.
FIG. 6 is side elevation view of the tire handling robot.

The Tire Handling Robot:

FIG. 5 schematically illustrates a front elevation view of the tire handling robot 200 and FIG. 6 schematically illustrates a side elevation view of the tire handling robot 200.

The tire handling robot 200 may include an articulating arm assembly 210 having at least three axes of freedom. A proximal end 212 of the articulating arm assembly 210 may be coupled to a surface mounting plate 220 configured to be coupled to a support surface. The tire gripping tool 202 and the scanner 204 may be coupled to a distal end 214 of the articulating arm assembly 210. The proximal end 212 may also be referred to herein as a proximal arm member 212 and the distal end 214 may also be referred to herein as a distal arm member 214.

The tire handling robot 200 may further include a first arm portion 230 and a second arm portion 232 coupled to the distal end 214 of the articulating arm assembly 210. The first arm portion 230 may also be referred to herein as a first arm 230 and the second arm portion 232 may also be referred to herein as a second arm 232. The tire gripping tool 202 may be coupled to the first arm portion 230 and the scanner 204 may be coupled to the second arm portion 232. Accordingly, the first arm portion 230 may carry the tire gripping tool 202 and the second arm portion 232 may carry the scanner 204. In certain embodiments, at least one of the first arm portion 230 or the tire gripping tool 202 may consist of a pneumatic double ended cylinder.

The tire gripping tool 202 may include rubber bumpers 240 mounted on the ends of the tire gripping tool 202 to provide extra grip when engaging the tread portion 116 of the tire 110.

As previously mentioned, the tire handling robot 200 is configured to pick up the tire 110 off of the tire position station 160 using the tire gripping tool 202 such that the tire gripping tool 202 engages the tread portion 116 of the tire 110. A gripping force applied to the tread portion 116 of the tire 110 by the tire gripping tool 202 is adjusted based on the tire code 120, as scanned by the tire identification station 130. The tire handling robot 200 is then configured to place the tire 110 on one of the application stands 300A or 300B, which is available for receiving the tire 110, and disengage the tire gripping tool 202 from the tire 110. Once disengaged, the tire handling robot 200 may insert the scanner 204 into the cavity 114 of the tire 110 and perform the initial scan.

Figures 7, 8, 9:
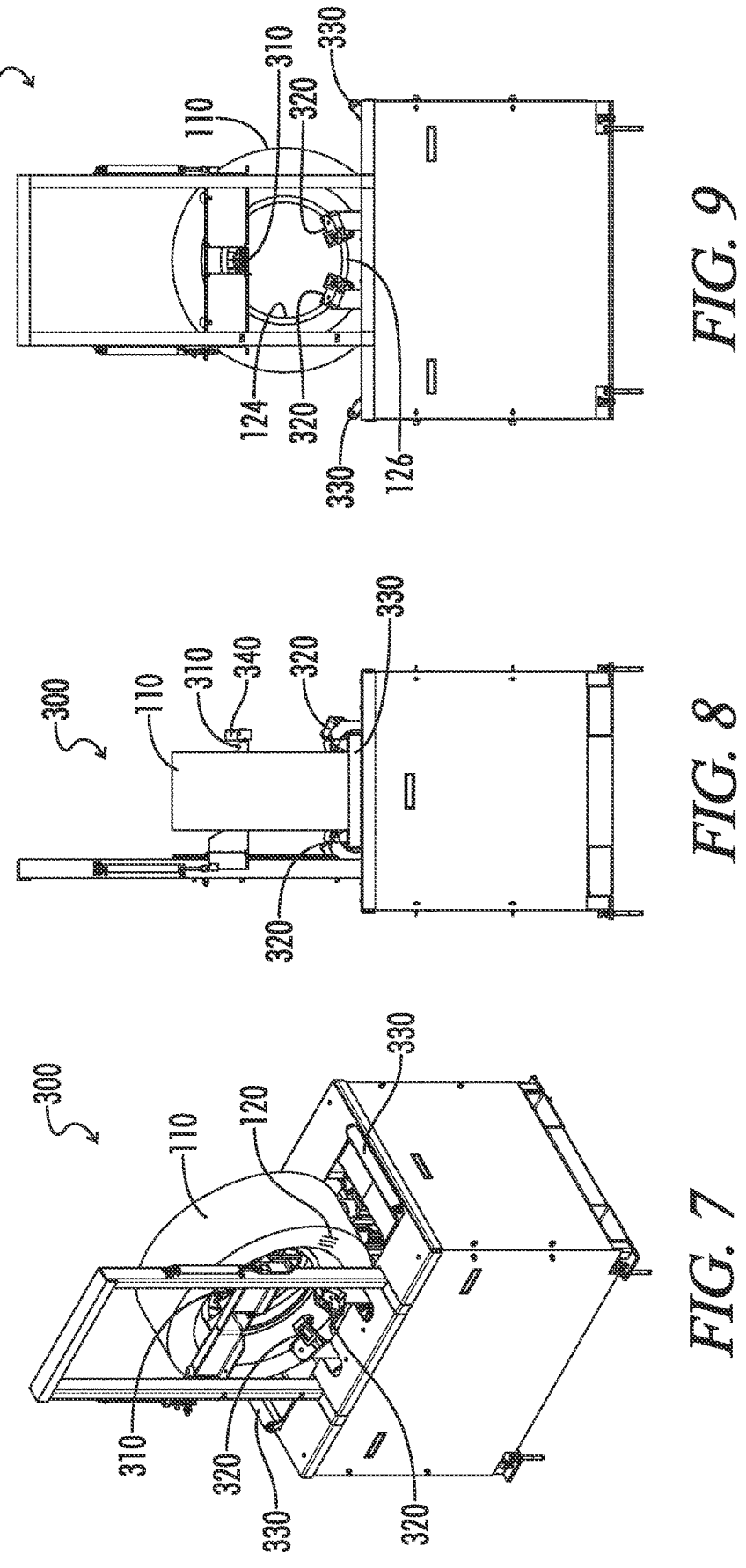
FIG. 7 is a perspective view of one application stand.
FIG. 8 is an end elevation view of the application stand of FIG. 7.
FIG. 9 is a rear elevation view of the application stand of FIG. 7.

The Sealant Application Stands:

FIG. 7 schematically illustrates a perspective view of the at least one application stand 300, FIG. 8 schematically illustrates a side elevation view of the at least one application stand 300, and FIG. 9 schematically illustrates a rear elevation view of the at least one application stand 300. The first and second applications stands 300A, 300B may be identical and may further be described by describing the at least one application stand 300.

The at least one application stand 300 may include a top stabilization bar 310 and a plurality of drive rollers (not shown) positioned below the top stabilization bar 310. An upper portion of the inner diameter 124 of the tire 110 may be configured to rest on the top stabilization bar 310. A portion of the tread portion 116 of the tire 110 may be configured to rest on the plurality of drive rollers. The plurality of drive rollers may be configured to rotate the tire 110 about its rotational axis 122, for example, during scanning of the inner surface portion 112 of the tire 110 and application of the sealant bead 104 to the inner surface portion 112 of the tire 110.

The at least one application stand 300 may further include a plurality of bead spreader fingers 320 configured to spread a bead 126 of the tire 110 apart so that the dispense robot 400 may more easily access the inner surface portion 112 of the tire 110. The top stabilization bar 310 and the plurality of drive rollers may simultaneously acuate downward to allow the plurality of bead spreader fingers 320 to reach into the cavity 114 of the tire 110. Once the plurality of bead spreader fingers 320 are in position, the top stabilization bar 310 and the plurality of drive rollers may simultaneously acuate upward to cause the plurality of bead spreader fingers 320 to engage the bead 126 of the tire 110 such that the bead 126 is seated in the plurality of bead spreader fingers 320. Once seated, the plurality of bead spreader fingers 320 may be actuated to move away from the tire 110, thereby spreading the bead 126 of the tire 110 out to a set distance.

The at least one application stand 300 may further include a plurality of side stabilization arms 330 configured to pivot into engagement with the tread portion 116 of the tire 110. Each of the plurality of side stabilization arms 330 may include rollers configured to rotationally engage the tread portion 116 of the tire 110. The plurality of side stabilization arms 330 may be configured to engage the tread portion 116 of the tire 110 prior to rotation of the tire 110 by the plurality of drive rollers.

All moves of the at least one application stand 300 may be accomplished with servomotors except for the top stabilization bar 310 and the plurality of side stabilization arms 330. The top stabilization bar 310 and the plurality of side stabilization arms 330 may utilize air cylinders wherein the pressure is controlled using a proportional valve.

The at least one application stand 300 may further include a sensor 340 coupled to the top stabilization bar 310. The sensor 340 may be configured to sense a rotational position of the tire 110 by detecting a physical indicia on the rotating tire 110 passing a sensor 340. The physical indicia may, for example, be the tire code 120 defined on the tire 110. The sensor 340 may, for example, be a BANNER® QS30PDPQ sensor or the like sensor.

The Dispense Robot:

FIG. 10 schematically illustrates a side elevation view of the dispense robot 400, FIG. 11 schematically illustrates a front elevation view of the dispense robot 400, and FIG. 12 schematically illustrates a bottom plan view of the dispense robot 400. FIG. 13 schematically illustrates a side elevation view of the dispense tool 402 of the dispense robot 400 from FIG. 10. FIG. 14 schematically illustrates a bottom plan view of the dispense tool 402 of the dispense robot 400 from FIG. 12. FIG. 15 schematically illustrates a cross-sectional view of the dispense tool 402 of the dispense robot 400.

The dispense robot 400 may include an articulating arm assembly 430 having at least three axes of freedom. A proximal end 432 of the articulating arm assembly 430 may be coupled to a surface mounting plate 440 configured to be coupled to a support surface. The dispense tool 402 may be coupled to a distal end 434 of the articulating arm assembly 430. Accordingly, the dispense tool 402 is configured to be carried by the distal end 434 of the articulating arm assembly 430 of the dispense robot 400. The proximal end 432 may also be referred to herein as a proximal arm member 432 and the distal end 434 may also be referred to herein as a distal arm member 434.

The dispense robot 400 may further include a mixing valve 450 positioned on one of the articulating arm assembly 430 or the dispense tool 402. The mixing valve 450 may be configured to be coupled to two of the plurality of eFlow drum pumps 106 via a first sealant component metering dispenser 452 and a second sealant component metering dispenser 454. The first and second sealant component metering dispensers 452, 454 may be gear meters such as an NORDSON® servo driven gear meter. In other optional embodiments, the first and second sealant component metering dispensers 452, 454 may be a GRACO® HFR pump (e.g., featuring a hydraulic reciprocating pistol). As is best seen in FIGS. 10 and 11, the first and second sealant component metering dispensers 452, 454 may be mounted on the articulating arm assembly 210. First and second flexible conduits 455 and 457, as schematically seen in FIG. 3, may connect the first and second sealant component metering dispensers 452, 454, respectively, to the sealant nozzle 460.

A first shut off valve 459 may be disposed between the first sealant component metering dispenser 452 and the sealant nozzle 460 for shutting off flow of the first sealant component. A second shut off valve 461 may be disposed between the second sealant component metering dispenser 454 and the sealant nozzle 460 for shutting off flow of the second sealant component. The shut off valves 459 and 461 are preferably snuff back valves. The working principal of a snuff back valve is that on shutting off the valve a negative pressure is created to pull back the sealant material so as to achieve a quick cut off and/or prevent dripping of the sealant material.

A first on/off valve 465 may be located upstream of the first sealant component metering dispenser 452. A second on/off valve 467 may be located upstream of the second sealant component metering dispenser 454. The on/off valves may be pancake type valves.

The dispense tool 402 may include a sealant nozzle 460. The sealant nozzle 460 may include a nozzle tip 462 configured to dispense the sealant bead 104. The at least one sensor 410 may be positioned on the dispense tool 402 and may be configured to sense a position of the nozzle tip 462 relative to the inner surface portion 112 of the tire 110.

The at least one sensor 410 of the dispense robot 400 may include a first sensor 412 and a second sensor 414 located on opposite sides of the sealant nozzle 460. The first sensor 412 may also be referred to herein as a first distance sensor 412 and the second sensor 414 may also be referred to herein as a second distance sensor 414. The first and second sensors 412, 414 may be configured to view along a length 464 of the sealant nozzle 460 (shown in FIG. 13) such that the distance 420 of the nozzle tip 462 from the inner surface portion 112 of the tire 110 may be detected by at least one of the first sensor 412 or the second sensor 414. The first and second sensors 412, 414 may, for example, be LJV KEYENCE® profilometers.

In an embodiment as seen in FIG. 14 one of the first and second sensors 412, 414 may be located upstream of the sealant nozzle 460 with reference to a rotational direction of the tire 110 relative to the sealant nozzle 460, and the other of the first and second sensors may be located downstream of the sealant nozzle with reference to the rotational direction of the tire 110. In FIG. 14, assuming the tire rotational direction is from left to right, the first sensor 412 is the upstream sensor and the second sensor 414 is the downstream sensor.

The nozzle tip 462 has a tip axis 463 defining a direction in which the bead of sealant 104 is dispensed from the nozzle tip 462. Each of the first and second distance sensors 412 and 414 has a sensing axis 413 and 415, respectively, arranged parallel to the dispensing axis 463 of the nozzle tip 462.

One of the first and second distance sensors, in the illustrated embodiment the first distance sensor 412, is arranged beside the sealant nozzle 460 such that as the nozzle tip 462 traverses the width of the inner surface 112 of tire 110 in the traversing direction, the dispensing axis 463 of the nozzle tip 462 and the sensing axis 413 of the first distance sensor 412 intersect the inner surface 112 along a common circumferential line of the inner surface 112. The other of the first and second distance sensors, in the illustrated embodiment the second distance sensor 414, is arranged rearward (for example in a range of 11 to 16 mm rearward) relative to the sealant nozzle 460 with reference to the traversing direction such that as the nozzle tip 462 traverses the width of the inner surface 112 in the traversing direction the nozzle tip 462 leads the second distance sensor 414. For example, as seen in the schematic view of FIG. 4 the nozzle tip 462 is shown as moving in a traversing direction from left to right in the figure to lay down the sealant bead 104.

The first and second sensors 412 and 414, in combination with the controller 500 further discussed below, allow the nozzle tip 462 to be oriented perpendicular to the inner surface 112 of tire 110. The controller is configured to receive distance signals from the first and second distance sensors 412 and 414 and based upon a geometry of the inner surface 112 of the tire 110 to orient the sealant nozzle 460 so that the dispensing axis 463 is maintained perpendicular to the inner surface 112 of the tire 110 as the nozzle tip 462 traverses the width of the inner surface 112 in the traversing direction.

As previously mentioned, in certain optional embodiments at least one of the first sensor 412 or the second sensor 414 may be utilized to scan, in real-time, the gauge of the sealant bead 104 as it is applied to the inner surface portion 112 of the tire 110 and transmit associated data to be displayed on the display 518. For example, one of the first sensor 412 or the second sensor 414 may be configured to scan the inner surface portion 112 of the tire 110 while the other sensor scans the sealant bead 104 just after application thereof to the inner surface portion 112 of the tire 110.

The sealant nozzle 460 may further include a static mixer 470 positioned between the nozzle tip 462 and the first and second sealant component metering dispensers 452, 454. The static mixer 470 may also be referred to herein as an internal static mixer 470. As illustrated in FIG. 15, the static mixer 470 may include a plurality of irregular internal passages so as to create a thorough mixing of the two sealant components before exiting the sealant nozzle tip 462. The static mixer 470 may have a length in a range of 12 to 18 inches, preferably about 16 inches.

The first and second sealant component metering dispensers 452, 454 may be coupled directly to the static mixer 470. In certain alternate embodiments, the first and second sealant component metering dispensers 452, 454 may be coupled to the static mixer 470 using first and second flexible conduits 455 and 457.

The dispense tool 402 may further include an air nozzle 480 positioned adjacent to the nozzle tip 462. configured to eject an air stream 482 (shown in FIG. 14) directed against the sealant bead 104 to aid in tacking the bead of sealant material to the inner surface portion 112 of the tire 110. In certain embodiments, the air stream 482 may be planar.

In certain optional embodiments, the dispense robot 400 may include a camera 483 mounted on the dispense tool 402 such that an operator may be able to view the sealant bead 104 on the display 518 as it is dispensed.

The Controller:

FIG. 16 schematically illustrates a controller 500 of the tire sealant cell system 100. The controller 500 may generate command signals for controlling the operation of the various components (e.g., the tire identification station 140, the first weigh station 150, the tire position station 160, the discharge receiving station 170, the second weigh station 180, the final station 190, the tire handling robot 200, the first and second application stations 300A, 300B, and the dispense robot 400) of the tire sealant cell system 100, which command signals are indicated schematically in FIG. 16 by phantom lines connecting the controller 500 to the aforementioned various components with the arrow indicating the flow of the command signal from the controller 500 to the respective components.

It will be understood that the data from the various aforementioned components, as disclosed herein, may be transmitted from the various aforementioned components to the controller 500, as also indicated schematically by the phantom lines and arrows.

For example, command signals from the controller 500 to each of the tire identification station 140, the first weigh station 150, the tire position station 160, the discharge receiving station 170, the second weigh station 180, the final station 190 may control movement of each of the first, second, third, fourth, fifth, and sixth conveyor belts 142, 152, 162, 172, 182, 192. Data from the tire identification station 140 to the controller 500 may include the tire code 120 as scanned by the bar code reader 144. Data from the first weigh station 150 to the controller 500 may include a weight of the tire 110 (e.g., a first tire 110A, a second tire 110B, a third tire 110C, etc.) prior to application of the sealant layer 102. Data from the tire position station 160 to the controller 500 may include a position of the tire 110 on the third conveyor belt 162, which may be utilized by the tire handling robot 200 for engaging the tire 110. Data from the second weigh station 180 to the controller 500 may include a weight of the tire 110 (e.g., a first tire 110A, a second tire 110B, a third tire 110C, etc.) after application of the sealant layer 102. The controller 500 may store the before and after weight of the tire 110 in association with the tire code 120 for use during future applications of the sealant layer 102 to tires having the same tire code 120.

Further for example, command signals from the controller 500 to the tire handling robot 200 may control movement of the articulating arm assembly 210, the tire gripping tool 202, and the scanner 204, as well as control functionalities of the scanner 204. Data from the tire handling robot 200 to the controller 500 may include a position of each of the articulating arm assembly 210, the tire gripping tool 202, and the scanner 204, as well as outputs from the scanner 204 associated with the tire 110, which may be utilized for plotting a path of travel in x, y, z coordinates of the dispense robot 400 for applying the sealant bead 104 to the tire 110.

Further for example, command signals from the controller 500 to each of the first and second application stations 300A, 300B may control movement of each of the plurality of drive rollers, the top stabilization bar 310, the plurality of bead spreader fingers 320, and the plurality of side stabilization arms 330 associated with each respective application station. Data from each of the first and second application stations 300A, 300B to the controller 500 may include a position of each of the plurality of drive rollers, the top stabilization bar 310, the plurality of bead spreader fingers 320, and the plurality of side stabilization arms 330 associated with each respective application station.

Finally, for example, command signals from the controller 500 to the dispense robot 400 may control movement of the articulating arm assembly 430 and the dispense tool 402, as well as control a release of the sealant bead 104 from the dispense tool 402 and a release of the air stream 482 from the air nozzle 480, as well as control functionalities of the at least one sensor 410. Data from the dispense robot 400 to the controller 500 may include a position of the articulating arm assembly 430 and the dispense tool 402, as well as outputs from the at least one sensor 410 associated with at least one of the tire 110, the sealant bead 104, or the sealant layer 102.

Controller 500 includes or may be associated with a processor 510, a computer readable medium 512, a data base 514 and an input/output module or control panel 516 having a display 518. An example of the display 518 is also shown in FIG. 17. An input/output device 520, such as a keyboard or other user interface, is provided so that the human operator may input instructions to the controller. It is understood that the controller 500 described herein may be a single controller having all of the described functionality, or it may include multiple controllers wherein the described functionality is distributed among the multiple controllers.

Various operations, steps or algorithms as described in connection with the controller 500 can be embodied directly in hardware, in a computer program product 522 such as a software module executed by the processor 500, or in a combination of the two. The computer program product 522 can reside in RAM memory, flash memory, ROM memory, EPROM memory, EEPROM memory, registers, hard disk, a removable disk, or any other form of computer-readable medium 512 known in the art. An exemplary computer-readable medium 512 can be coupled to the processor 500 such that the processor can read information from, and write information to, the memory/storage medium. In the alternative, the medium can be integral to the processor. The processor and the medium can reside in an application specific integrated circuit (ASIC). The ASIC can reside in a user terminal. In the alternative, the processor and the medium can reside as discrete components in a user terminal.

The term "processor" as used herein may refer to at least general-purpose or specific-purpose processing devices and/or logic as may be understood by one of skill in the art, including but not limited to a microprocessor, a microcontroller, a state machine, and the like. A processor can also be implemented as a combination of computing devices, e.g., a combination of a DSP and a microprocessor, a plurality of microprocessors, one or more microprocessors in conjunction with a DSP core, or any other such configuration.

The terms "controller," "control circuit" and "control circuitry" as used herein may refer to, be embodied by or otherwise included within a machine, such as a general purpose processor, a digital signal processor (DSP), an application specific integrated circuit (ASIC), a field programmable gate array (FPGA) or other programmable logic device, discrete gate or transistor logic, discrete hardware components, or any combination thereof designed and programmed to perform or cause the performance of the functions described herein. A general purpose processor can be a microprocessor, but in the alternative, the processor can be a microcontroller, or state machine, combinations of the same, or the like. A processor can also be implemented as a combination of computing devices, e.g., a combination of a DSP and a microprocessor, a plurality of microprocessors, one or more microprocessors in conjunction with a DSP core, or any other such configuration.

The Method of Applying a Sealant Layer to an Inner Surface of a Tire:

A method of applying a sealant layer to an inner surface of a tire may comprise:

(a) picking up a first tire 110A with a tire handling robot 200 and placing the first tire 110A on a first application stand 300A with a rotational axis 122 of the first tire 110A oriented generally horizontally;

(b) scanning an inner surface 112 of the first tire 110A with a scanner 204 carried by the tire handling robot 200 as the first tire 110A is rotated by the first application stand 300A;

(c) applying a sealant bead 104 to the inner surface 112 of the first tire 110A with a dispense tool 402 carried by a dispense robot 400 as the first tire 110A is rotated by the first application stand 300A to form a sealant layer 102 on the inner surface 112 of the first tire 110A; and (d) scanning the sealant layer 102 of the first tire 110A with the scanner 204 carried by the tire handling robot 200 as the first tire 110A is rotated by the first application stand 300A.

The tire handling robot 200 of the method may include a first arm portion 230 carrying a tire gripping tool 202 and a second arm portion 232 carrying the scanner 204. In accordance with the method, after placing the first tire 110A on the first application stand 300A, the tire handling robot 200 may release the first tire 110A from the tire gripping tool 202, and then the tire handling robot 200 may insert the scanner 204 into a cavity 114 of the first tire 110A.

In step (a) the tire gripping tool 202 may grip a tread portion 116 of the first tire 110A.

The method may further comprise, after step (d), picking up the first tire 110A from the first application stand 300A with the tire handling robot 200 and placing the first tire 110A on a discharge conveyor 132.

The method may further comprise, prior to step (a), weighing the first tire 110A on a first weigh station 150 of a supply conveyor 130; and weighing the first tire 110A again on a second weigh station 180 of the discharge conveyor 132 and determining a change in weight of the first tire 110A.

The method may further comprise picking up a second tire 110B with the tire handling robot 200 and placing the second tire 110B on a second application stand 300B with a rotational axis 122 of the second tire 110B oriented generally horizontally; scanning an inner surface portion 112 of the second tire 110B with the scanner 204 carried by the tire handling robot 200 as the second tire 110B is rotated by the second application stand 300B; applying a sealant bead 104 to the inner surface portion 112 of the second tire 110B with the dispense tool 402 carried by the dispense robot 400 as the second tire 110B is rotated by the second application stand 300B to form a sealant layer 102 on the inner surface portion 112 of the second tire 110B; and scanning the sealant layer 102 of the second tire 110B with the scanner 204 carried by the tire handling robot 200 as the second tire 110B is rotated by the second application stand 300B.

The first and second application stands 300A, 300B may be arranged adjacent each other such that the tread portion 116 of the first tire 110A on the first application stand 300A faces the tread portion 116 of the second tire 110B on the second application stand 300B, with one side wall of each tire facing toward the tire handling robot 200 and with another side wall of each tire facing toward the dispense robot 400. The tire handling robot 200 may perform the scanning steps from one side of the first and second tires 110A, 110B. The dispense robot 400 may perform the applying steps from an opposite side of the first and second tires 110A, 110B.

The method may further comprise, prior to step (a), scanning with a bar code reader 144 the first tire 110A and identifying a tire code 120. The tire gripping tool 202 may grip a tread portion 116 of the first tire 110A and a gripping force is adjusted based upon the tire code 120.

The method may further comprise, during step (c), sensing a gauge of the sealant bead 104 as the sealant bead 104 is laid down on the inner surface portion 112 of the first tire 110A and recording data corresponding to the gauge of the sealant bead 104 in correlation with data corresponding to a location of the sealant bead 104 on the inner surface portion 112 of the first tire 110A.

The method may further comprise displaying on a display 518 a visual image 530 representative of the sealant bead 104 on the inner surface portion 112 of the first tire 110A. The visual image 530 (shown in FIG. 17) may include visual indicia 532 corresponding to whether the gauge of the sealant bead 104 is within the set criteria.

A Further Method of Applying a Sealant Layer to Inner Surfaces of Tires:

A further method of applying a sealant layer to inner surfaces of tires may comprise steps of:

(a) providing a tire sealant cell 100 including:

first and second sealant application stands 300A, 300B arranged adjacent each other such that when tires 110A, 110B, 110C, are received on the first and second sealant application stands with rotational axes 122 of the tires oriented generally horizontally, the tires are aligned end to end with tread areas 116 of the tires facing each other;

a tire handling robot 200 located on one side of the first and second sealant application stands; and a dispense robot 400 located on an opposite side of the first and second sealant application stands from the tire handling robot;

(b) picking up a first tire 110A with the tire handling robot 200 and placing the first tire 110A on the first sealant application stand 300A;

(c) applying a sealant bead 104 to an inner surface 112 of the first tire 110A with a dispense tool 402 carried by the dispense robot 400 as the first tire 110A is rotated by the first sealant application stand 300A to form a sealant layer 102 on the inner surface 112 of the first tire 110A;

(d) picking up a second tire 110B with the tire handling robot 200 and placing the second tire 110B on the second sealant application stand 300B;

(e) applying a sealant bead 104 to an inner surface 112 of the second tire 110B with the dispense tool 402 carried by the dispense robot 400 as the second tire 110B is rotated by the second sealant application stand 300B to form a sealant layer 102 on the inner surface 112 of the second tire 110B.

The method may further comprise, between steps (b) and (c), pre-scanning the inner surface portion 112 of the first tire 110A with a scanner 204 carried by the tire handling robot 200 as the first tire 110A is rotated by the first sealant application stand 300A.

The method may further comprise, during step (e): post-scanning the sealant layer 102 of the first tire 110A with the scanner 204 carried by the tire handling robot 200 as the first tire 110A is rotated by the first sealant application stand 300A; then removing the first tire 110A from the first sealant application stand 300A with the tire handling robot 200 and placing the first tire 110A on a discharge conveyor 132; then picking up a third tire 110C with the tire handling robot 200 and placing the third tire 110C on the first sealant application stand 300A; and then pre-scanning the inner surface portion 112 of the third tire 110C with the scanner 204 carried by the tire handling robot 200 as the third tire 110C is rotated by the first sealant application stand 300A.

The method may further comprise, after step (d) and before removing the second tire 110B from the second sealant application stand 300B: post-scanning the sealant layer 102 of the first tire 110A with the scanner 204 carried by the tire handling robot 200 as the first tire 110A is rotated by the first sealant application stand 300A; then removing the first tire 110A from the first sealant application stand 300A with the tire handling robot 200 and placing the first tire 110A on a discharge conveyor 132; then picking up a third tire 110C with the tire handling robot 200 and placing the third tire 110C on the first sealant application stand 300A; and then pre-scanning the inner surface portion 112 of the third tire 110C with the scanner 204 carried by the tire handling robot 200 as the third tire 110C is rotated by the first sealant application stand 300A.

The method may further comprise, before step (c), pre-scanning an inner surface portion 112 of the first tire 110A with a scanner 204 carried by the tire handling robot 200 as the first tire 110A is rotated by the first sealant application stand 300A; and, after step (c), post-scanning the sealant layer 102 of the first tire 110A with the scanner 204 carried by the tire handling robot 200 as the first tire 110A is rotated by the first sealant application stand 300A.

The tire handling robot 200 may include a first arm portion 230 carrying a tire gripping tool 202 and a second arm portion 232 carrying the scanner 204. After placing the first tire 110A on the first sealant application stand 300A, the tire handling robot 200 may release the first tire 110A from the tire gripping tool 202, and then the tire handling robot 200 may insert the scanner 204 into a cavity 114 of the first tire 110A.

The method may further comprise, prior to step (b) weighing the first tire 110A on a first weigh station 150 of a supply conveyor 130; after step (c) removing the first tire 110A from the first sealant application stand 300A with the tire handling robot 200 and placing the first tire 110A on a discharge conveyor 132; and weighing the first tire 110A again on a second weigh station 180 of the discharge conveyor 132 and determining a change in weight of the first tire 110A.

The method may further comprise, prior to step (b), scanning with a bar code reader 144 the first tire 110A and identifying a tire code 120. In step (b) a tire gripping tool 202 carried by the tire handling robot 200 may grip a tread portion 116 of the first tire 110A and a gripping force may be adjusted based upon the tire code 120.

The method may further comprise, during step (c), sensing a gauge of the sealant bead 104 as the sealant bead 104 is laid down on the inner surface portion 112 of the first tire 110A and recording data corresponding to the gauge of the sealant bead 104 in correlation with data corresponding to a location of the sealant bead 104 on the inner surface portion 112 of the first tire 110A.

The method may further comprise displaying on a display 518 a visual image 530 representative of the sealant bead 104 on the inner surface portion 112 of the first tire 110A. The visual image 530 may include visual indicia 532 corresponding to whether the gauge of the sealant bead 104 is within set criteria.

A Method of Applying a Sealant Layer to an Inner Surface of a Tire while Simultaneously Balancing the Tire:

The tire sealant cell system 100 may also be used to improve the balance of the tires 110 so that less additional balancing is required when the tire is mounted on a wheel. As schematically illustrated in FIG. 18 the tire 110 includes the indicia 120, which may be a bar code placed physically on the tire. This indicia 120 may be used as a reference point to identify circumferential locations on the tire. Any other physical feature on the tire could also be used as a reference point.

Prior to the time the tire 110 is received on the supply conveyor 130 the tire may be tested for dynamic balance on a dynamic balancer such as schematically indicated in FIG. 1 as 600. One example of a typical dynamic balancer is the Model FDB-6142T dynamic balancer available from Koku-sai, Inc. of Indianapolis, IN. The dynamic balancer 600 spins the tire and measures forces and moments caused by mass/geometry irregularities in the tire. In a typical dynamic balancer the tire is oriented horizontally so as to rotate about a vertical axis during testing, and the sidewall of the tire carrying the bar code indicia 120 is arranged facing upward. This upward facing sidewall is conventionally referred to as the "top" side of the tire, and if mounted on a wheel the corresponding flange of the wheel is referred to as the top flange. The opposite side of the tire is referred to as the "bottom" side. It will be understood that these are simply names of convenience and do not require the tire to actually be oriented in any specific manner.

During dynamic balancing the outward inertial force (also known as the "static" force) and the out of plane moment (also known as the "couple") combine via vectors to produce a net mass vector for each of the top and bottom sides of the tire. The values of these net mass vectors indicate how much mass (balancing weight) is needed and where it must be circumferentially located relative to the bar code indicia 120 to balance the tire so that no forces or moments would be created when spinning the tire. The dynamic balancer 600 measures the balance of just the tire because the tire is not yet mounted on a wheel. The locations of these net mass vectors are saved in a database as angles relative to the location of the bar code indicia 120 and are often referred to as the "light spots" of the tire. Two "light spots" are determined, one for the "top" side of the tire and one for the "bottom" side of the tire. This information is associated with each individual tire as identified by its bar code indicia 120. Thus, as each tire is tested on the dynamic balancer 600 its barcode is read and all the balance data, including the angular locations of the top and bottom light spots relative to the bar code indicia 120, is written to a database which may be the database 514 or another database to which the controller 500 has access.

When each tire later reaches one of the application stands such as 300A or 300B the bar code indicia 120 is read and the information regarding the angular locations of the top and bottom light spots is retrieved from the database. It is noted that in the example shown the application stands hold the tire in an orientation where it is now rotated about a horizontal axis and as noted above it will be understood that the terms "top" and "bottom" and only names referring to the data retrieved from the database and do not require that the tire be oriented in any particular manner during the application of the sealant bead 104.

Following is a description of a method by which the sealant bead can be applied so as to improve the dynamic balance of the tire. To understand the disclosed method it is helpful to consider how the sealant bead 104 can be laid down to form the sealant layer 102 in a manner that will improve the dynamic balance of a tire.

FIG. 18 schematically illustrates a hypothetical sealant layer 102 which has been laid down symmetrically about the centerline, also known as the equatorial plane EP of the tire. The non-cross-hatched portion of FIG. 18 represents a sealant bead having a starting end 104a and stopping end 104b located at the same angular location on the tire. Such a sealant layer would not in any way affect the static balance of the tire because the weight of the sealant layer is uniformly distributed relative to the axis of rotation of the tire. But due to the fact that the sealant bead is laid down in a spiral with beginning and ending portions of the bead laterally offset on opposite sides of the tire but at different angular locations this arrangement creates a dynamic imbalance in the tire. These laterally offset unbalanced portions of the sealant bead are those lying laterally outside of the imaginary lines L1 and L2 parallel to the equatorial plane EP as shown in FIG. 18. The dynamic imbalance of the sealant layer is minimized if instead of having the sealant bead 104 begin and end at the same angular position, the beginning and ending portions of the sealant bead are overlapped. Such an overlapping portion of the sealant bead 104 is shown in the cross-hatched area 104c. The dynamic imbalance from the spiral wound sealant bead 104 alone is minimized if there is a plus or minus 180° overlap. The following method makes use of the placement and the degree of overlap of the sealant bead, in combination with a tire having known top and bottom light spot locations, to optimize the improvement in overall dynamic balance of the tire with the sealant bead.

As will be seen, the starting angular location of the sealant bead adjacent the first or "top" side of the tire may be used to optimize dynamic balance of the first side of the tire, and then ending angular location of the sealant bead can be used to optimize dynamic balance of the second or "bottom" side of the tire adjacent the end of the sealant bead.

FIG. 19 is a schematic illustration of the tire 110 mounted in one of the application stands such as 300A or 300B so that the rotational axis of the tire is oriented horizontally. FIG. 19 is a view facing the first or top side wall of the tire which carries the bar code indicia 120. In the following description all angles are measured clockwise from the barcode indicia 120 when viewing the top or bar code side of the tire. It is noted that in FIG. 19 the tire 110 is understood to be rotated in a clockwise direction during application of the sealant bead 104, so the sealant bead 104 is actually wound in a counterclockwise direction from its starting end 104a to its stopping end 104b as indicated by the arrow 121 in FIG. 19.

First the angular locations of the top and bottom light spots for each individual tire, designated here as $\theta_T$ and $\theta_B$, respectively, are obtained from the database. This can be described as identifying a circumferential location of a first balance light spot on a first side of the tire as a first angle $\theta_T$ measured about a rotational axis of the tire from the physical indicia 120 on the tire and identifying a circumferential location of a second balance light spot on a second side of the tire as a second angle $\theta_B$ measured about the rotational axis of the tire from the physical indicia 120.

Then a target starting location for the sealant bead 104 adjacent the first side of the tire is determined as a target starting angle $\theta_S$ measured about the rotational axis of the tire from the physical indicia 120. The target starting angle $\theta_S$ is determined as a function of the first angle $\theta_T$. More particularly the target starting angle $\theta_S$ is determined by the function:

$$\theta_S = \theta_T + 90°.$$

This orientation of the starting angle will align the heaviest part of the sealant winding adjacent the first or top side of the tire with the tire top light point.

Also, a target ending location for the sealant bead adjacent the second side of the tire is determined as a target ending angle $\theta_E$ measured about the rotational axis of the tire from the physical indicia 120, the target ending angle $\theta_E$ being determined as a function of the second angle $\theta_B$. More particularly the target ending angle $\theta_E$ is determined by the function:

$$\theta_E = \theta_B - 90°.$$

This orientation of the ending angle will align the heaviest part of the sealant winding adjacent the second or bottom side of the tire with the tire bottom light spot.

The sealant bead is applied to the inner surface of the tire in a spiral pattern beginning at an actual starting location selected based upon the target starting angle $\theta_S$ and ending at an actual ending location selected based upon the target ending angle $\theta_E$.

It will be appreciated that the target starting and ending angles are theoretical optimal starting and ending angles. But there will be unavoidable errors in the actual starting and ending locations due to inaccuracies in the control of the machinery of the application stands such as 300A or 300B. This error is referred to herein as a "spotting error."

As described above the application stand 300A or 300B will start and stop application of the sealant bead 104 based on a photo-eye triggering off the bar code indicia 120. The biggest issue with accuracy of spotting of the beginning and ending points is a latency in the sealant pumping system that causes a delay between commanded and actual application of sealant.

For any given tire the required accuracy of the sealant start and stop positions depends on the value of tire imbalance relative to the impact which can be achieved by placement of the sealant layer 102. In general, the greater the tire imbalance, the less accurate the actual sealant start and stop positions need to be relative to the target start and stop positions in order to improve the dynamic balance of the tire after placement of the sealant layer 102. An actual starting or stopping position that is plus or minus 45 degrees from the target starting or stopping positions, respectively, at least will not increase the tire dynamic imbalance. Spotting errors less than 45 degrees will improve the tire dynamic balance. Thus, a maximum acceptable spotting error range for the actual starting angle is within plus or minus 45 degrees from the target starting angle. Similarly, the maximum acceptable spotting error range for the actual ending angle is within plus or minus 45 degrees from the target ending angle.

Preferably the acceptable spotting error is within plus or minus 30 degrees. More preferably the acceptable spotting error is within plus or minus 15 degrees.

A tire 110 manufactured by any of the above methods may include a tread portion 116 and first and second sidewall portions 118a and 118b extending radially inward from the tread portion. The tire may have a first balance light spot location on a first side of the tire prior to sealant application measured as a first angle $\theta_T$ about a rotational axis of the tire from a physical indicia 120 on the tire and a second balance light spot location on a second side of the tire prior to sealant application measured as a second angle $\theta_B$ about the rotational axis of the tire from the physical indicia 120 on the tire. An inner surface 112 of the tire may define an inner cavity 114 of the tire between the first and second sidewall portions 118a and 118b. A spiral wound sealant bead 104 may be laid down on the inner surface 112, the sealant bead 104 having a starting location closest to the first sidewall and ending location closest to the second sidewall. The starting location may be within a range of 45 degrees to 135 degrees ahead of the first balance light spot location OT relative to a direction of winding of the sealant bead and the ending location may be within a range of 45 degrees to 135 degrees behind the second balance light spot location $\theta_B$ relative to the direction of winding of the sealant bead.

More preferably the starting location may be within a range of 60 degrees to 120 degrees ahead of the first balance light spot location OT relative to a direction of winding of the sealant bead and the ending location may be within a range of 60 degrees to 120 degrees behind the second balance light spot location $\theta_B$ relative to the direction of winding of the sealant bead.

Even more preferably the starting location may be within a range of 75 degrees to 105 degrees ahead of the first balance light spot location OT relative to a direction of winding of the sealant bead and the ending location may be within a range of 75 degrees to 105 degrees behind the second balance light spot location $\theta_B$ relative to the direction of winding of the sealant bead.

Thus, it is seen that the apparatus and methods of the present invention readily achieve the ends and advantages mentioned as well as those inherent therein. While certain preferred embodiments of the present invention have been illustrated and described for purposes of the present disclosure, numerous changes in the arrangement and construction of parts and steps may be made by those skilled in the art which changes are encompassed within the scope and spirit of the present invention as defined by the appended claims.

What is claimed is:

1. A method of applying a sealant layer to an inner surface of a tire, the method comprising:
   (a) identifying a circumferential location of a first balance light spot on a first side of the tire as a first angle θr measured about a rotational axis of the tire from a physical indicia on the tire;
   (b) identifying a circumferential location of a second balance light spot on a second side of the tire as a second angle θB measured about the rotational axis of the tire from the physical indicia;
   (c) determining a target starting location for a sealant bead adjacent the first side of the tire as a target starting angle θS measured about the rotational axis of the tire from the physical indicia, the target starting angle θS being determined as a function of the first angle θr;
   (d) determining a target ending location for the sealant bead adjacent the second side of the tire as a target ending angle θF measured about the rotational axis of the tire from the physical indicia, the target ending angle θF being determined as a function of the second angle θB; and
   (e) applying the sealant bead to the inner surface of the tire in a spiral pattern beginning at an actual starting location selected based upon the target starting angle $\theta_S$ and ending at an actual ending location selected based upon the target ending angle $\theta_E$.

2. The method of claim 1, wherein:
   the applying of the sealant bead in step (e) improves both static and dynamic balance of the tire as compared to the static and dynamic balance of the tire prior to application of the sealant bead.

3. The method of claim 1, wherein:

in step (c) the target starting angle $\theta_S$ is determined by the function:

$$\theta_S = \theta_T + 90°.$$

4. The method of claim 3, wherein:

in step (d) the target ending angle $\theta_E$ is determined by the function:

$$\theta_E = \theta_B - 90°.$$

5. The method of claim 1, wherein:

the actual starting angle and the actual ending angle are each within an acceptable spotting error range of the target starting angle and the target ending angle, respectively.

6. The method of claim 5, wherein:

the acceptable spotting error range is plus or minus 45 degrees.

7. The method of claim 5, wherein:

the acceptable spotting error range is plus or minus 30 degrees.

8. The method of claim 5, wherein:

the acceptable spotting error range is plus or minus 15 degrees.

9. The method of claim 1, wherein:

the physical indicia is a bar code located on a first side wall defining the first side of the tire.

10. A tire manufactured by the method of claim 1.

* * * * *